US012275032B2

(12) United States Patent
Shrimpton et al.

(10) Patent No.: US 12,275,032 B2
(45) Date of Patent: Apr. 15, 2025

(54) SHOWER HEAD AND METHOD OF OPERATION TO PRODUCE A SUSPENSION OF WATER DROPLETS IN AIR

(71) Applicant: KELDA SHOWERS LIMITED, Eastleigh (GB)

(72) Inventors: John Scott Shrimpton, Salisbury (GB); Samvir Thandi, Southampton (GB); Benjamin Doulis, Southampton (GB); William Penfold, Southampton (GB)

(73) Assignee: KELDA SHOWERS LIMITED, Eastleigh (GB)

( * ) Notice: Subject to any disclaimer, the term of this patent is extended or adjusted under 35 U.S.C. 154(b) by 432 days.

(21) Appl. No.: 17/917,298

(22) PCT Filed: Apr. 14, 2021

(86) PCT No.: PCT/GB2021/050894
§ 371 (c)(1),
(2) Date: Oct. 6, 2022

(87) PCT Pub. No.: WO2021/209749
PCT Pub. Date: Oct. 21, 2021

(65) Prior Publication Data

US 2023/0124727 A1 Apr. 20, 2023

(30) Foreign Application Priority Data

Apr. 14, 2020 (GB) ..................................... 2005441

(51) Int. Cl.
*B05B 7/04* (2006.01)
*B05B 1/18* (2006.01)

(52) U.S. Cl.
CPC ............ *B05B 7/0483* (2013.01); *B05B 1/185* (2013.01)

(58) Field of Classification Search
CPC ......... B05B 1/18; B05B 1/185; B05B 7/0416; B05B 7/0441; B05B 7/045; B05B 7/0483
See application file for complete search history.

(56) References Cited

U.S. PATENT DOCUMENTS 3,965,494 A * 6/1976 Baker ..................... B05B 7/066 4/615
5,405,089 A 4/1995 Heimann
(Continued)

FOREIGN PATENT DOCUMENTS

DE 10108248 A1 8/2002
WO 2018037210 A1 3/2018

OTHER PUBLICATIONS

International Search Report for corresponding application PCT/GB2021/050894 filed Apr. 14, 2021; Mail date Jul. 9, 2021.
(Continued)

*Primary Examiner* — Darren W Gorman
(74) *Attorney, Agent, or Firm* — CANTOR COLBURN LLP

(57) ABSTRACT

A shower head is supplied with an annular airflow which surrounds a column of water travelling through a chamber to produce a suspension of water droplets in air, the diameter and length of the chamber and the diameter of the water column are selected in combination with the fluid flow parameters to operate the shower within a defined parameter space corresponding to the non-axisymmetric Rayleigh breakup regime, where the water column remains intact and spaced apart from the chamber wall for the entire length Lc of the chamber, where the airflow perturbs the water column within the chamber causing it to disintegrate into droplets downstream of the chamber outlet, and where multiple chambers are moulded on non-parallel axes with elastomeric linings facilitating withdrawal of the mould tool.

15 Claims, 13 Drawing Sheets

(56) References Cited

U.S. PATENT DOCUMENTS

| | | | |
|---|---|---|---|
| 9,173,809 B2* | 11/2015 | Honeyands | A61H 33/027 |
| 9,751,095 B2* | 9/2017 | Honeyands | B05B 1/185 |
| 9,855,569 B2* | 1/2018 | Honeyands | A61H 33/6036 |
| 2013/0015268 A1 | 1/2013 | Huang | |
| 2019/0176173 A1* | 6/2019 | Honeyands | B05B 7/0087 |

OTHER PUBLICATIONS

Written Opinion for corresponding application PCT/GB2021/050894 filed Apr. 14, 2021; Mail date Jul. 9, 2021.

* cited by examiner

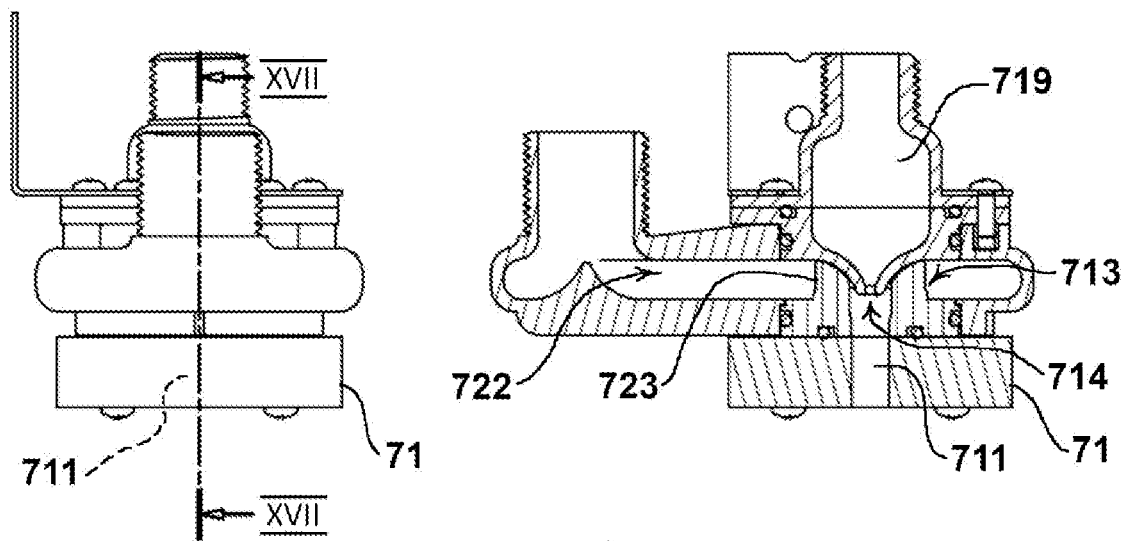
FIG. 16
FIG. 17
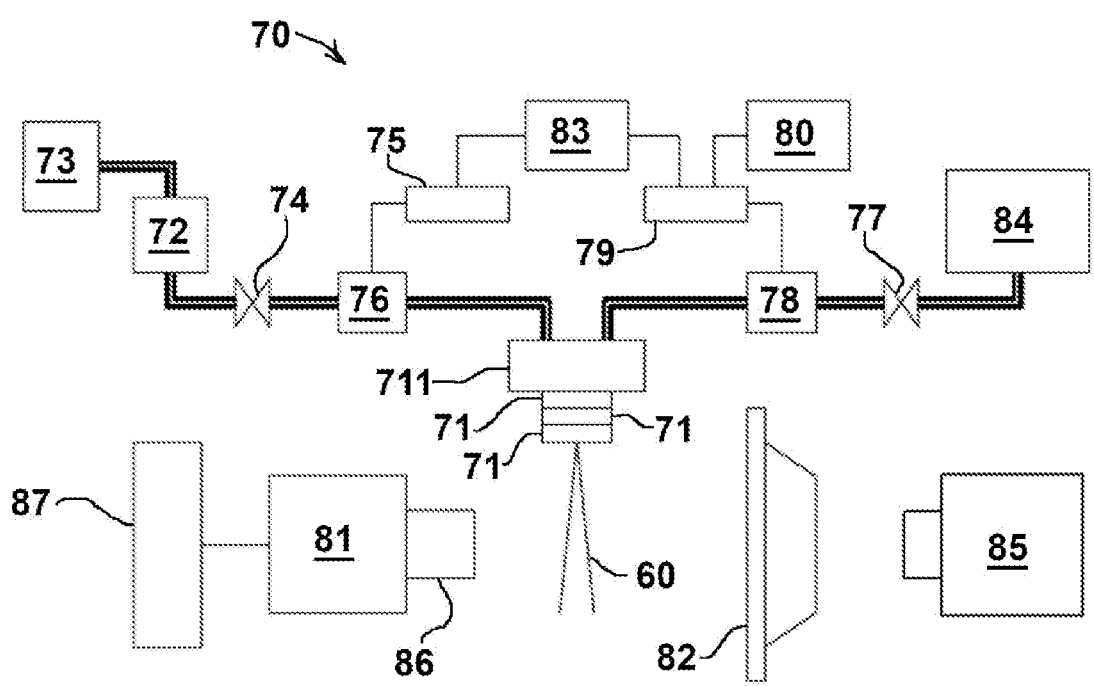
FIG. 18

$d_w = 2mm$
$L = 25mm$
$D_c = 8mm$
$Re_w \approx 5246$
$We_a \approx 26$ $d_w$ = 3mm
L = 9mm
Dc = 8mm
$Re_w$ ≈ 7950
$We_a$ ≈ 23

$d_w$ = 3mm
L = 15mm
Dc = 8mm
$Re_w$ ≈ 7950
$We_a$ ≈ 23

$d_w$ = 3mm
L = 20mm
Dc = 8mm
$Re_w$ ≈ 7950
$We_a$ ≈ 23

$d_w$ = 3mm
L = 25mm
Dc = 8mm
$Re_w$ ≈ 7950
$We_a$ ≈ 23

FIG. 27  FIG. 28  FIG. 29  FIG. 30
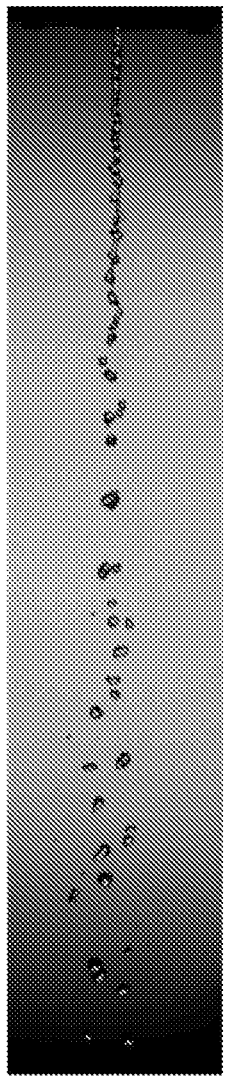
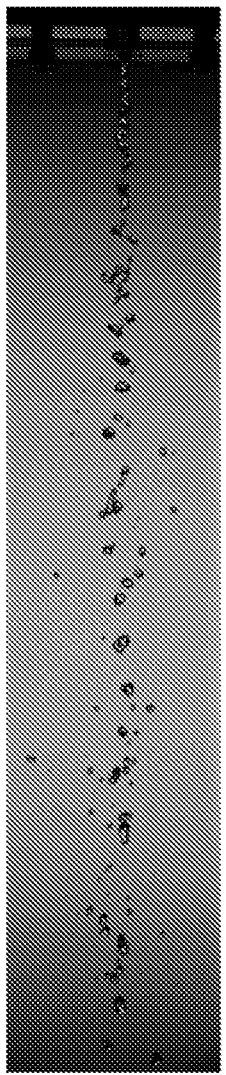
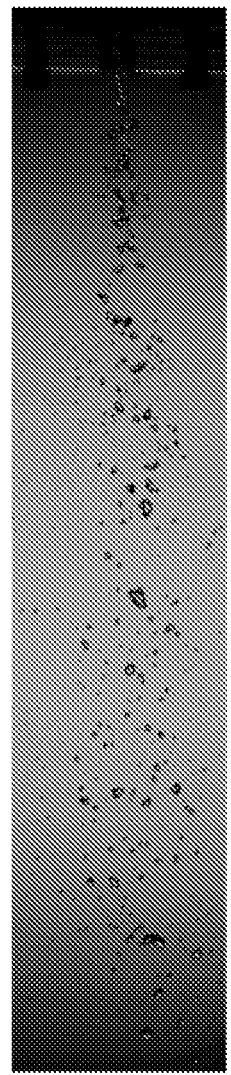
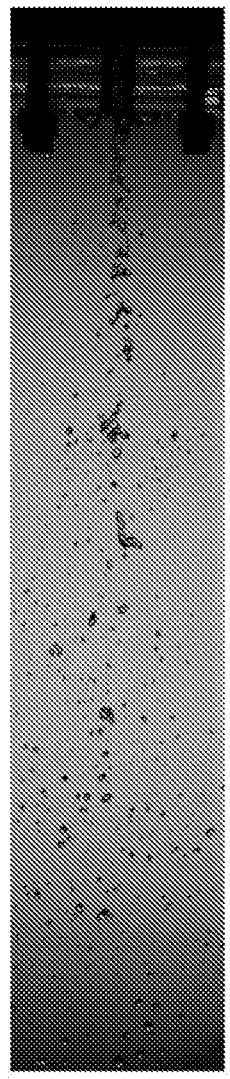
| $d_w = 2mm$ |
| $L = 9mm$ |
| $Dc = 7mm$ |
| $Re_w \approx 5250$ |
| $We_a \approx 24$ |
| $d_w = 2mm$ |
| $L = 14mm$ |
| $Dc = 7mm$ |
| $Re_w \approx 5250$ |
| $We_a \approx 24$ |
| $d_w = 2mm$ |
| $L = 19mm$ |
| $Dc = 7mm$ |
| $Re_w \approx 5250$ |
| $We_a \approx 24$ |
| $d_w = 2mm$ |
| $L = 24mm$ |
| $Dc = 7mm$ |
| $Re_w \approx 5250$ |
| $We_a \approx 24$ |

SHOWER HEAD AND METHOD OF OPERATION TO PRODUCE A SUSPENSION OF WATER DROPLETS IN AIR

This invention relates to showers which produce a spray of water droplets suspended in a moving airstream, to reduce the volume of water required for bathing.

Such showers may be referred to as "water-in-air" showers and are known, for example, from U.S. Pat. No. 3,965,494, JP H09 262512, WO2009/056887 A1, WO2012/110790 A1, EP2723503 B1, and WO2018/037210 A1.

Water-in-air showers must produce a substantial proportion of droplets that are large enough (at least about 500 microns diameter) to retain heat and momentum while they travel in suspension from the shower head to the user's body surface. On impact with the body, the water droplets deliver a sensation of warmth and impact which is comparable with a conventional water-only shower, i.e. a shower that delivers a substantially larger volume of water as a spray without the use of air.

Thus, water-in-air showers are distinguished, inter alia by their relatively much larger droplet size, from fogging and misting nozzles which use compressed air to deliver a fog or mist of much smaller water droplets for horticultural, fire suppression or other purposes, for example, as taught by U.S. Pat. Nos. 5,520,331 and 7,523,876 B2.

The spray from a water-in-air shower should be delivered at a velocity sufficient to produce the desired impact sensation on the user's body, comparable with that of a conventional, water-only shower. Thus, a water-in-air shower is distinguished inter alia by its relatively much lower velocity range from a yet further group of nozzles that produce a jet of water droplets carried in a stream of compressed air at supersonic or near-supersonic speeds for use in cleaning surfaces, for example, as taught by US 2002/0000477 A1.

WO2018/037210 A1 to the present applicant (hereafter referred to as "WO'210") discloses a water-in-air showerhead having a shaped mixing chamber in which a central column of water flows coaxially within a faster, outer airflow. The shaped mixing chamber produces a spray of larger and smaller droplets, the smaller droplets being produced by detachment of a thin film of water from the wetted wall of the chamber and contributing to the visual definition of the spray. Due to the convergent-divergent-convergent geometry of the mixing chambers, the shower head is assembled from multiple parts. Although having only a small number of nozzles and an air blower of modest power, the shower head produces a voluminous spray with very little water.

A coaxial flow as taught by WO'210 may be referred to as a wake flow, and when confined within a chamber may become absolutely unstable due to constructive interaction between the two fluid streams, as discussed in JUNIPER, M. et al (2003)—The stability of ducted compound flows and consequences for the geometry of coaxial injectors—Journal of Fluid Mechanics, vol. 482, pp. 257-269-DOI: 10.1017/S0022112003004075. The effect is further described in JUNIPER, M. (2008)—The effect of confinement on the stability of non-swirling round jet/wake flows-Journal of Fluid Mechanics, vol. 605, pp. 227-252-DOI: 10.1017/S0022112008001547.

Although a proportion of smaller droplets provide visual definition to a water-in-air shower, it is found that the smaller droplets produced by the WO'210 shower head tend to move more slowly than the larger droplets and so drift away from the central trajectory of the spray. This is inconvenient for a user who wishes to keep their hair dry while bathing, since the cloud of smaller droplets can dampen the hair.

Thus, it would be desirable in some use situations to produce a spray with a reduced proportion of smaller droplets so that more of the droplets follow the trajectory of the spray at a similar velocity.

It would also be desirable to further reduce the noise produced by a water-in-air shower head.

It would also be desirable to simplify the manufacturing process for a water-in-air shower head.

Accordingly the present invention provides, in a first aspect a shower apparatus and a method of operating the shower apparatus, and in a second aspect a shower head and a method of manufacturing the shower head, as defined in the claims.

In the first aspect, the novel shower apparatus includes an air supply means, a water supply means, and a shower head, the shower head including at least one chamber.

The or each chamber is defined by a chamber wall and extends along a central chamber axis, from an air inlet and a water inlet at a first end of the chamber, to an outlet opening at a second end of the chamber. The air inlet is arranged around the water inlet.

The or each chamber has a length Lc along the chamber axis from the water inlet to the outlet opening.

The water supply means is arranged for connection to a supply of water having a density $\rho_w$, surface tension $\sigma_w$ and dynamic viscosity $\mu_w$ to eject the water at a velocity $u_w$ from the water inlet, axially centrally into the chamber along the chamber axis, as a column of water with a diameter $d_w$.

The air supply means is arranged to supply an annular flow of air at a density $\rho_a$ and a velocity $u_a$ from the air inlet into the chamber around the water column. The flow of air is arranged to destabilise the water column within the chamber so as to break the water column into a shower of droplets suspended in the air flowing from the outlet opening.

An aerodynamic Weber number is defined as $We_a = (\rho_a \cdot (u_a - u_w)^2 \cdot d_w)/\sigma_w$, and a liquid Reynolds number is defined as $Re_w = (\rho_w \cdot u_w \cdot d_w)/\mu_w$.

In accordance with the first aspect of the invention, $(u_a > u_w)$ and $(5 \leq We_a \leq 55)$ and $(3000 \leq Re_w \leq 10000)$. In embodiments, $(10 \leq We_a \leq 55)$.

The water column is contained within a dimensional envelope defined as a surface of rotation about the chamber axis, the dimensional envelope being spaced apart radially inwardly from the chamber wall at all points along the length Lc of the chamber.

The water column is continuous for the length Lc of the chamber.

In accordance with the method of the first aspect, the shower head is configured and supplied with water and air as described above.

Compared with a prior art arrangement, the novel shower apparatus is found to provide an improved droplet size distribution with a lower proportion of smaller droplets and a more consistent velocity profile at the same air and water flow rates, with reduced noise and comparable spray force. Moreover, this may be achieved with a substantially cylindrical chamber configuration, which simplifies moulding, particularly where the shower head includes a plurality of said chambers.

In the second aspect, the shower head includes a plurality of chambers, each chamber extending along a central chamber axis, from a water inlet at a first end of the chamber, to an outlet opening at a second end of the chamber.

The shower head is arranged to conduct water in use to the first end of each chamber so that the water flows through the chamber along the chamber axis and is ejected from the outlet opening. The outlet openings of the plurality of chambers form a spaced array at an outlet side of the shower head. The chamber axes are non-parallel.

Each chamber includes an outer moulding and an inner moulding.

The outer moulding is formed from a first, non-elastomeric plastics material and defines an outer chamber wall extending along the chamber axis. The outer chamber wall is individual to the respective chamber and surrounds the respective chamber axis.

The inner moulding is formed from a second, elastomeric plastics material and forms a lining of the chamber. The lining extends along the chamber axis and is surrounded by the outer chamber wall.

The method of the second aspect includes forming the outer moulding of each chamber by means of mould tooling; and then, after forming the outer moulding, forming the inner moulding of each chamber by means of the mould tooling; and then withdrawing a plurality of mould cores of the mould tooling simultaneously from the plurality of chambers along a withdrawal axis.

The outer moulding provides the necessary mechanical support to define the chamber geometry to the required tolerance, while the flexibility of the elastomeric lining makes it possible to withdraw the mould cores simultaneously from all of the chambers along the withdrawal axis, which may lie on the mean central axis of the shower head, even where the chambers are cylindrical and the chamber axes are non-parallel. Thus, the novel shower head may be moulded more easily. It is possible also that the elastomeric lining may contribute to the reduced noise observed when the shower head is arranged to form part of a shower apparatus in accordance with the first aspect of the invention.

The first and second aspects of the invention may be applied independently or in combination.

Further features and advantages will be appreciated from illustrative embodiments of the invention which will now be described, purely by way of example and without limitation to the scope of the claims, and with reference to the accompanying drawings, in which:

FIG. 16 shows a test chamber forming part of a test apparatus.

FIG. 17 is a section through the test chamber at XVII-XVII of FIG. 16.

FIG. 18 shows the test apparatus including the test chamber.

FIGS. 22-30 are photographs of the water column issuing from the test chamber when the test chamber was supplied with air and water at the indicated parameter values.

Figure 31:
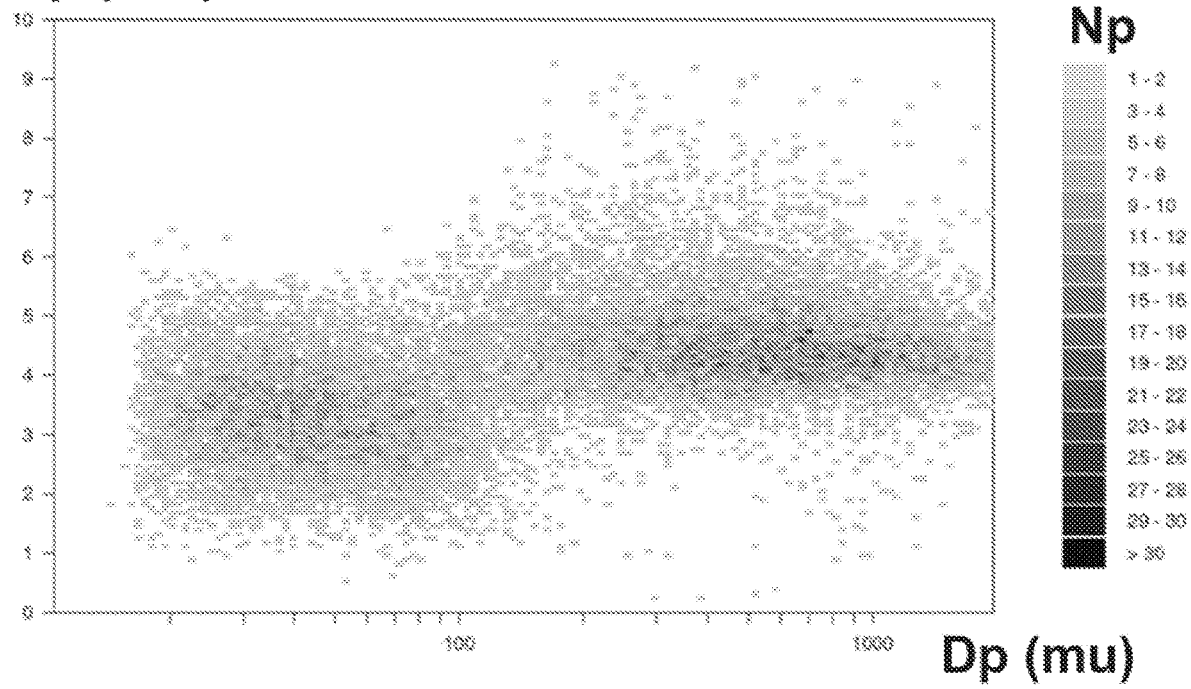
Figure 32:
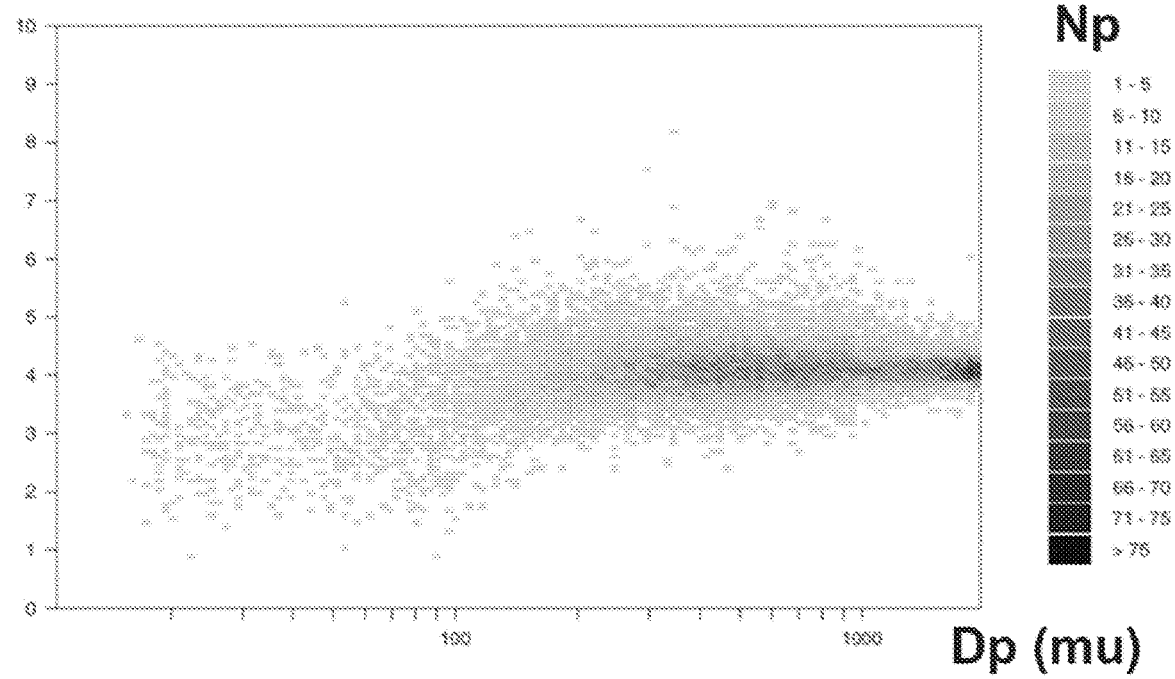

FIGS. 31 and 32 are scatter graphs showing two data sets obtained from two respective tests carried out with the test apparatus and showing the number of droplets (Np) emitted from the test chamber by droplet velocity (Vp) and diameter (Dp), wherein:
  in the test of FIG. 31 the test chamber was operated in accordance with WO'210, and not in accordance with the present invention in its first aspect; and
  in the test of FIG. 32 the test chamber was configured and operated in accordance with an embodiment of the present invention in its first aspect.

Figure 33:
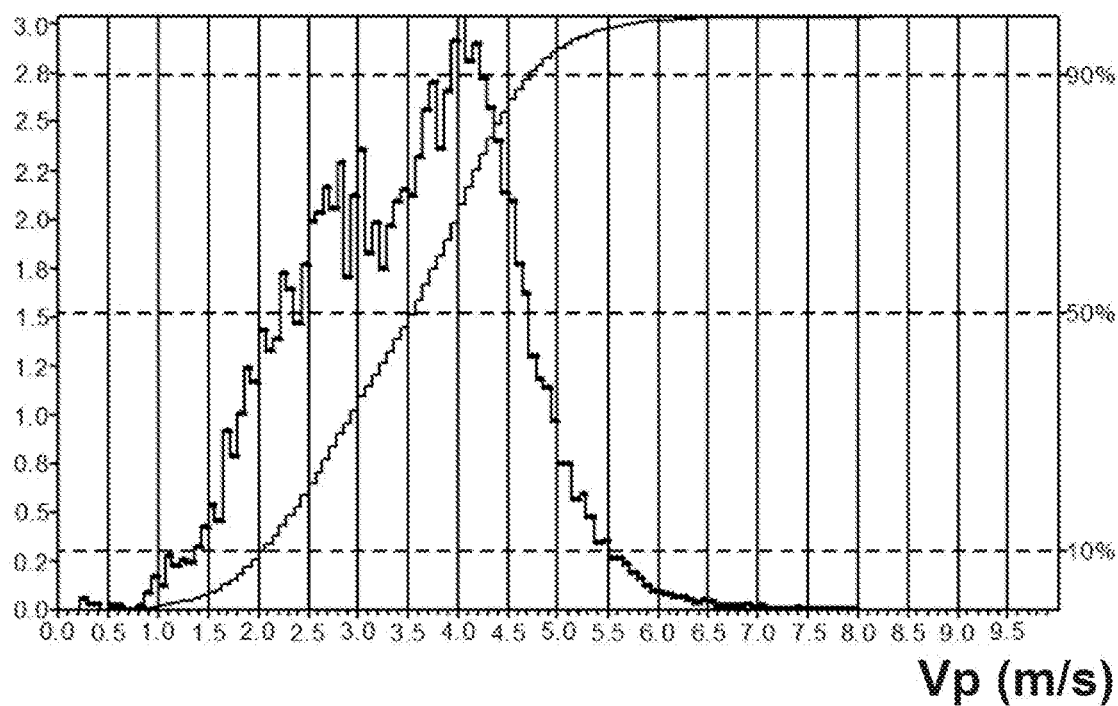
Figure 34:
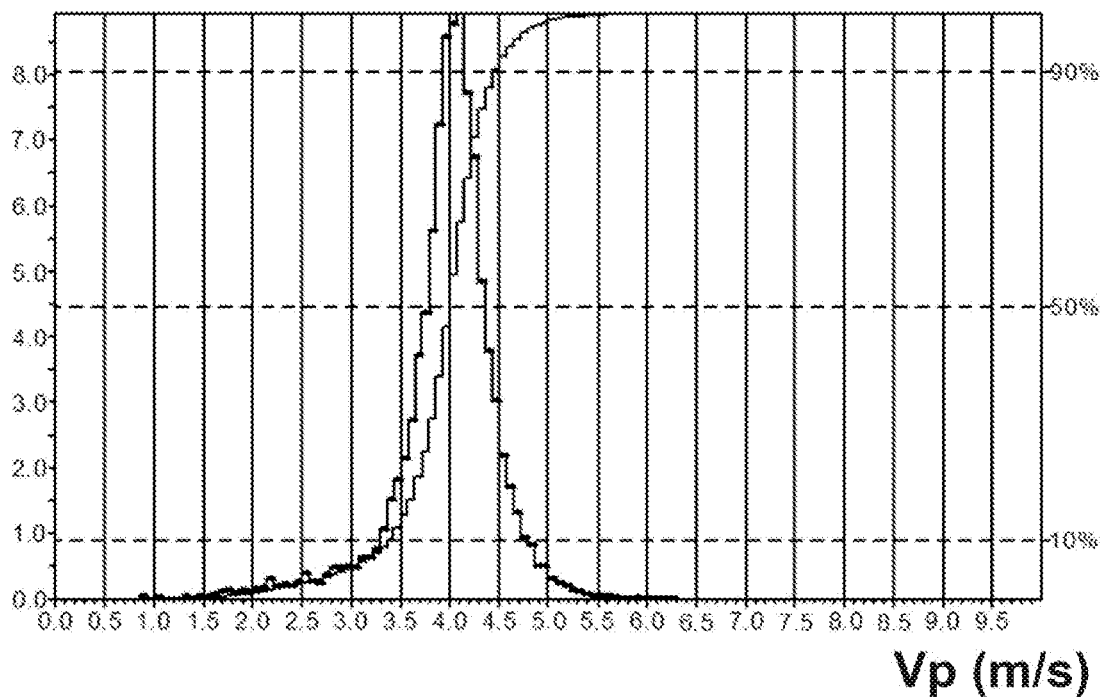

FIGS. 33 and 34 present the same droplet velocity (Vp) data as shown respectively in FIGS. 31 and 32 as a percentage (Np (%)) of the total number of droplets (Np) recorded, wherein:
  FIG. 33 presents the data from the test of FIG. 31, and
  FIG. 34 presents the data from the test of FIG. 32.

Reference numerals and characters appearing in more than one of the figures indicate the same or corresponding elements in each of them.

Figure 1:
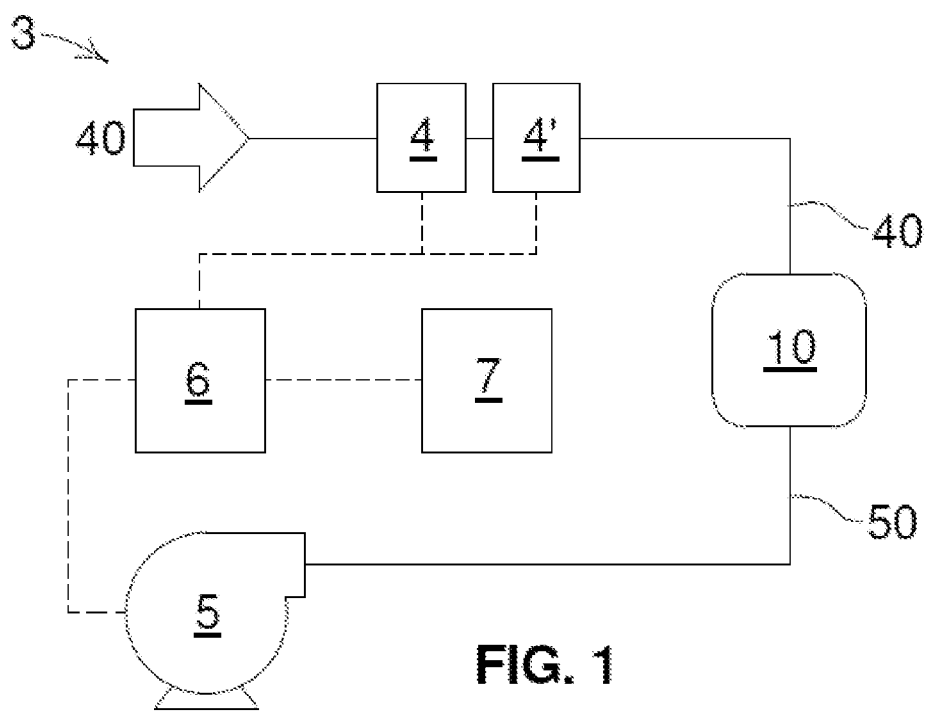
FIG. 1 shows a shower apparatus including a shower head in accordance with an embodiment of the invention.

Referring to FIG. 1, the shower apparatus 1 includes an air supply means 2, a water supply means 3, and a shower head 10, and may further include a controller 6 for controlling the operation of the apparatus responsive to input from user controls 7. The controller 6 may include a processor configured to execute instructions stored in non-transient memory, for example, to regulate the airflow responsive to user input and/or changes in the water flow or pressure.

The shower head 10 may include only one chamber 11, or a plurality of chambers 11, also referred to herein as mixing chambers. The plurality of chambers may consist of at least 5 and not more than 20 mixing chambers, preferably from 8-20 chambers, yet more preferably from 10-16 chambers.

Referring also to FIGS. 2-4 and FIG. 14, in a particularly preferred embodiment, as illustrated, the shower head includes only 12 mixing chambers, which are arranged to provide a well defined, voluminous spray with a wide base for showering the entire body.

Figure 4:
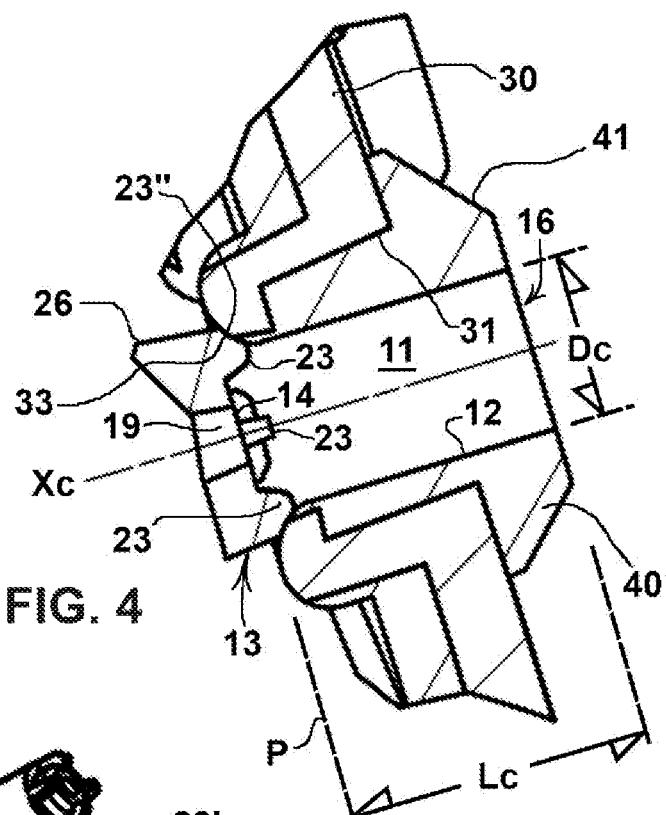
FIG. 4 is an enlarged view of one chamber of the shower head as shown in FIG. 2, wherein the section at III-III is taken along the central chamber axis.
Figure 14:
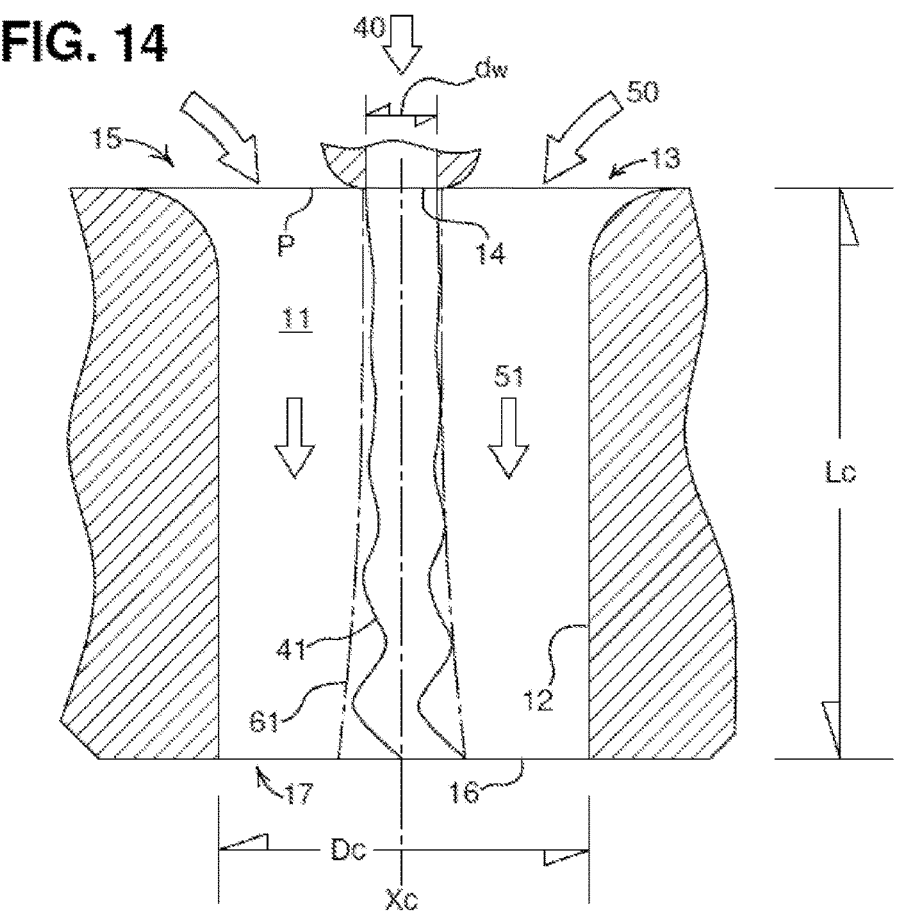
FIG. 14 is a simplified section through one chamber of the shower head in the same plane as FIG. 4 and illustrating the chamber geometry.

As best seen in FIG. 4 and in the simplified section of FIG. 14, each chamber 11 is defined by a radially inwardly facing surface, referred to as the chamber wall 12, which bounds its flowpath. The chamber extends along a central chamber axis Xc, from an air inlet 13 and a water inlet 14 at a first end 15 of the chamber, to an outlet opening 16 at a second end 17 of the chamber.

The outlet openings 16 of the plurality of chambers form a spaced array at an outlet side 18 of the shower head.

The chamber wall 12 may be substantially cylindrical, at least for part of the length of the chamber; which is to say, it may be cylindrical within manufacturing limitations, which may require a small draft angle. In alternative embodiments, the chamber wall 12 may be non-cylindrical; for example, it may be a surface of rotation which varies progressively in diameter along the length of the chamber.

The water inlet 14 is arranged on the central chamber axis Xc, and the air inlet 13 is arranged around the water inlet 14—which is to say, the air inlet 13 substantially surrounds or encircles the water inlet 14 so as to deliver an annular flow of air into the chamber. Thus, the air and water inlets 13, 14 may be coaxial with the chamber wall 12.

The chamber has a length Lc along the chamber axis Xc from the water inlet 14 to the outlet opening 16, and (if a surface of rotation) a diameter Dc defined by the chamber wall 12 in a plane normal to the chamber axis Xc.

The water supply means 3 is connected in use to a supply of water 40 having a density $\rho_w$, surface tension $\sigma_w$ and dynamic viscosity $\mu_w$ to supply the water to the water inlets 14 of the shower head. The water is ejected from each water inlet 14 at a velocity $u_w$, axially centrally into the chamber 11 along the chamber axis Xc, as a column 41 of water with a diameter $d_w$.

The water inlet 14 is preferably circular (as the open end of a cylindrical water flowpath 19) so that the diameter $d_w$ of the water column 41 is defined by the diameter of the water inlet 14 in the plane P containing the water inlet 14 and normal to the chamber axis Xc. If the water inlet 14 is non-circular then the diameter $d_w$ of the water column 41 may be defined by the diameter of a circle equal in area to the section area of the water inlet in the plane P.

The water inlet diameter may be selected based on the desired total water consumption of the shower head divided by the number of chambers 11, and is preferably large enough to ensure that performance is substantially unaffected by scaling which can clog the nozzles of a conventional, water-only shower head.

As a guide, the diameter $d_w$ of the water column (hence the diameter of a circular water inlet) may be at least 1 mm and not more than 4 mm, preferably from 1.5 mm-3 mm, for example, about 2 mm, when the length Lc of the chamber 11 is from 3 mm to 25 mm.

The water supply means 3 may include any arrangement for receiving water from a water supply and conducting it to the water inlet 14 of each chamber 11 or to the main water inlet 20 of the shower head 10 (best seen in FIG. 7) from which the water is distributed to the water inlets 14 of the individual chambers. In a very simple form, the water supply means may include merely a connector for connecting a flowpath of the shower head 10 to a water supply at suitable pressure. The water supply means may further include a mixer valve, a heater and/or a thermostatic valve or other water temperature control arrangement, a water pump, and/or any other means for producing or regulating the flow of water.

Water velocity $u_w$ depends on the water volume flow rate, which in turn depends on the water supply pressure. The water supply means 3 may include a water flow and/or pressure sensor 4' for sensing the pressure and/or flow rate of the water supply. Alternatively or additionally, in order to obtain a known water velocity, the water supply means 3 may include a pressure or flow regulator 4 which is arranged to provide a fixed volume flow rate over a large range of variation in the upstream water supply pressure.

The flow regulator 4 may be a simple, passive device as known in the art. Alternatively or additionally, the water supply means 3 may include an active water flow regulator 4, as known in the art, to maintain a constant water volume flow rate, e.g. based on feedback from the flow sensor 4'.

The air supply means 2 is arranged to supply an annular flow 51 of air 50 at a density $\rho_a$ and a velocity $u_a$ from the air inlet 13 into the chamber 11 around the water column 41.

The air supply means 2 may include a fan or blower 5 which takes in ambient air and supplies it to the air inlet 13 of each chamber, or to the main air inlet of the shower head (part of the side frame, not shown, which surrounds the plenum chamber 22) from which the air 50 is distributed to the air inlets 13 of the individual chambers. The fan or blower 5 may be a centrifugal fan, for example, a model RV45-3/24S centrifugal fan available from ebm-papst Mulfingen GmbH & Co. KG of Mulfingen, Germany. The air supply means 2 may further include a heater for heating the air, a filter and/or any other means for controlling airflow parameters as known in the art.

In use, as further discussed below, the power supply setting of the fan or blower 5 and the diameter Dc of the chamber 11 are selected to obtain the desired air velocity $u_a$ at the first end 15 of the chamber, and in combination with the length Lc of the chamber to ensure that the dimensional envelope 61 of the water column 41 is spaced apart from the chamber wall 12 for the entire length Lc of the chamber 11—which is to say, to ensure that the intact water column 41 does not contact the chamber wall 12.

Air density $\rho_a$ is taken to be a fixed value at the selected temperature and pressure, the pressure depending on the pressure/flow rate profile of the fan or blower 5 used to supply air to the shower head. As an approximation, air density $\rho_a$ may be taken to be the nominal value of 1.225 $kgm^{-3}$ (correction-should read 1.204 $kgm^{-3}$) at 1 atmosphere and 20° C.

By way of example, a shower head comprising a plurality of chambers for showering the whole body may be supplied with a total of about 4 l/m (litres per minute)-7 l/m of water and an airflow at a corresponding volume flow rate. For example, when the shower head is supplied with water at 5 l/m the air flow may be around 330 l/m.

Referring particularly to FIG. 14, the air inlet 13 of each chamber 11 may be defined by a radially inwardly convergent passageway which curves through an angle of approximately 45° to 90° towards the direction of the chamber axis Xc. This makes it possible to direct the airflow into each chamber 11 from a common plenum chamber 22 (best seen in FIG. 3) of relatively large volume without excessive elongating the shower head in the length dimension of the chambers.

The radially inner wall of the air inlet passageway may be defined by the radially outer surface of the wall defining the water flowpath 19 to the water inlet 14 in-between guide vanes 23, further described below. It will be noted that the section of FIG. 4 is taken in the plane of the diametrically opposed guide vanes 23 and so the air inlet 13 is partially hidden; the radially inner surface of the air inlet can be seen at the tip of each of the conical structures (through which the water flowpaths extend) in FIGS. 3, 5 and 7, and is just visible together with its radially outer surface in the simplified section of FIG. 14.

A mean airflow direction of the air inlet in the plane of the section of FIGS. 4 and 14, containing the chamber axis Xc, may be defined at any given point as a line tangent to a curved centre line (not shown), the centre line being defined mid-way between the radially inner and outer walls of the air inlet. The mean airflow direction thus changes along the length of the air inlet passageway to the point where the cylindrical portion of the chamber wall 12 begins, so that the cylindrical portion of the chamber wall 12 extends part way along the length of the chamber 11, with the remainder of the chamber wall 12 defining the radially inwardly curved wall of the air inlet 13.

The section area of the air inlet 13 normal to its mean airflow direction may reduce progressively in the flow direction towards the water inlet 14. Said section area in a conic plane intersecting the extremity of the radially inner wall of the air inlet 13 in the plane P of the water inlet may be approximately equal to the section area of the airflow annulus, in a plane normal to the chamber axis Xc, defined between the chamber wall 12 and the water column 41 at the point where the cylindrical portion of the chamber wall 12 meets the curved portion of the chamber wall 12 at the air inlet 13.

The rotational speed of the fan or blower 5 may be controlled by a controller 6 responsive to variations in water flow rate (e.g. responsive to a signal from water flow and/or pressure sensor 4'), to maintain a predefined ratio of air pressure or volume flow rate to water pressure or volume flow rate. This can compensate for fluctuations in water supply pressure due to varying demand from the different outlets in a typical water supply system.

The user may control one parameter, or two or more parameters via user controls 7, while the remaining parameters are controlled automatically based on the user selected parameter value. For example, the user could adjust the water flow rate, with the air flow rate or power supply to the fan or blower 5 being adjusted automatically or simultaneously by the controller 6 to correspond to the selected water volume flow rate.

Alternatively or additionally, the user could control the air flow to water flow ratio within a predefined range, e.g. by selecting a desired operating state via user controls 7, to adjust the spray to suit individual user preference. The user controls may allow the user to adjust the temperature of the air or water or, for example, to select air without water for drying off after a shower.

For a known volume flow rate of air 50 to the chamber 11, the air velocity $u_a$ at the water inlet 14, where the air 50 flows into the chamber 11 around the water column 41, may be determined based on the cross-sectional area of the air inlet 13 and of the airflow annulus between the chamber wall 12 and the water column 41, normal to the airflow direction.

In accordance with the first aspect of the invention, an aerodynamic Weber number is defined as $$We_a = (\rho_a \cdot (u_a - u_w)^2 \cdot d_w)/\sigma_w$$

and a liquid Reynolds number is defined as $$Re_w = (\rho_w \cdot u_w \cdot d_w)/\mu_w$$

For ease of reference the fluid parameters are set out in Table 1 below, including nominal values which may be used for the purpose of calculation.

TABLE 1

Fluid parameters

| Symbol | Parameter | Nominal value | Units |
|---|---|---|---|
| $\rho_a$ | Density of air | 1.225 (1.204)* | $kgm^{-3}$ |
| $\rho_w$ | Density of water | 997 (993)** | $kgm^{-3}$ |
| $\sigma_w$ | Surface tension of water at 37° C. | 0.0701 | $Nm^{-1}$ |
| $\mu_w$ | Dynamic viscosity of water at 37° C. | $6.92 \times 10^{-4}$ | $kgm^{-1}s^{-1}$ |
| $u_a$ | Velocity of air flow | | $ms^{-1}$ |
| $u_w$ | Velocity of water flow | | $ms^{-1}$ |
| $d_w$ | Diameter of water column | | m |

Notes on Table 1:
*As a nominal value at 1 atmosphere and 20° C., the 1.225 $kgm^{-3}$ value for air density $\rho_a$ is incorrect. The correct value is 1.204 $kgm^{-3}$.
**The value of water density $\rho_w$ may be taken as 997 $kgm^{-3}$ at a nominal water temperature of 25° C., or more preferably as 993 $kgm^{-3}$ at a more preferred water temperature of 37° C., approximating to normal body temperature.

The aerodynamic or gaseous Weber number $We_a$ is based on the relative velocity between the air and water flows 41, 51 and represents the ratio between the inertial or momentum forces of the air 50 and the surface tension force of the water 40 at the water/air interface. At higher aerodynamic Weber numbers inertial forces dominate and the system becomes more unstable.

The liquid Reynolds number $Re_w$ represents the ratio between inertial or momentum forces and viscous fluid forces within the water column 41, and is a measure of turbulence.

The surface tension $\sigma_w$ and dynamic viscosity $\mu_w$ of the water 40 are defined at a standard temperature of 37° C., although of course the water temperature may vary, e.g. responsive to a user operated mixer valve or other temperature control.

Figure 15:
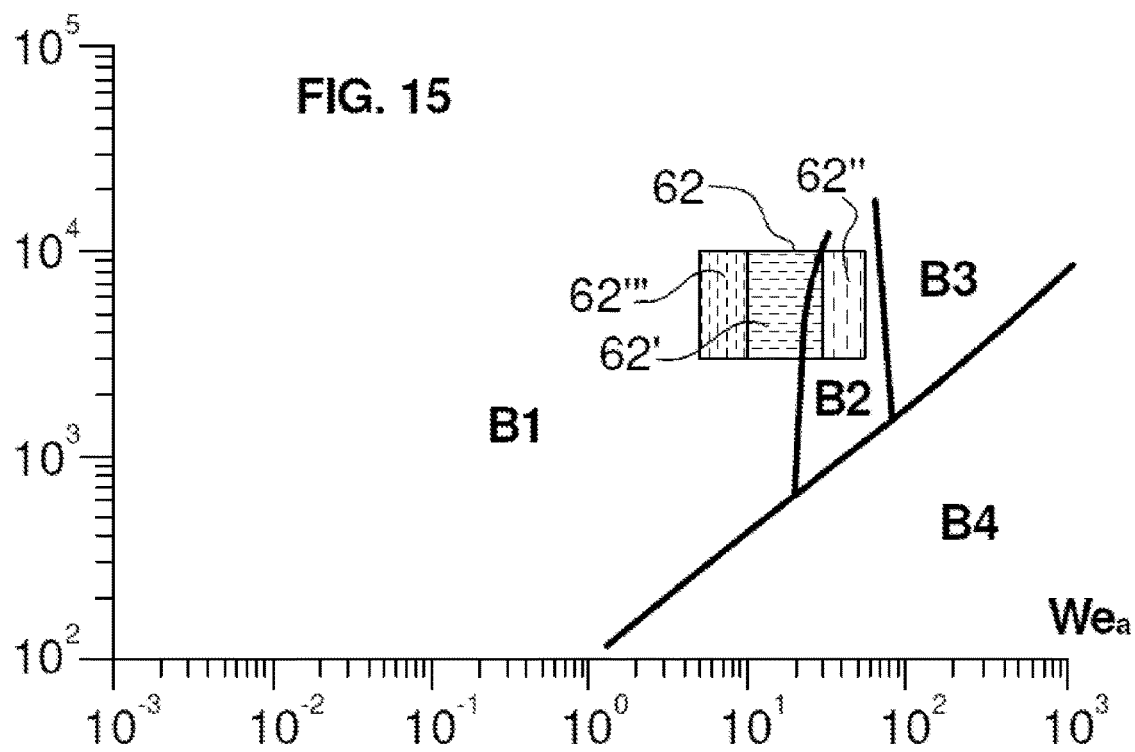
FIG. 15 is a graph locating the target breakup regime in the liquid Reynolds number/aerodynamic Weber number parameter space by reference to Farago and Chigier (op. cit., below).

Referring to FIG. 14, when operated in a defined parameter space 62 as illustrated in FIG. 15 and further discussed below, the water column 41 develops a perturbation about the chamber axis Xc, so that it progressively approaches the chamber wall 12 as it travels along the length Lc of the chamber 11. The fluid flow parameters are selected within the defined parameter space 62 so that the maximum radial extent of the perturbation lies within a dimensional envelope 61, which is defined as a surface of rotation about the chamber axis Xc and is spaced apart radially inwardly from the chamber wall 12 at all points along the length Lc of the chamber 11.

The water 40 is ejected at a velocity $u_w$ from the water inlet 14, axially centrally into the chamber 11 along the chamber axis Xc, as a column 41 of water with a diameter $d_w$. The velocity $u_a$ of the flow of air 51 is greater than the velocity $u_w$ of the water column 41, so that the flow of air 51 destabilises the water column 41 within the chamber 11 so as to break the water column 41 in a primary mode of droplet formation into a shower or spray of droplets 60 (FIG. 18) suspended in the air 50 flowing from the outlet opening 16, in which the human user may bathe.

The fluid flow parameters are selected together with the diameter $d_w$ of the water column (hence, the water inlet 14) and the chamber length Lc and diameter Dc to operate the shower head within the defined parameter space 62 wherein ($5\leq We_a\leq 55$) and ($3000\leq Re_w\leq 10000$) so that the water column 41 is contained within the dimensional envelope 61 for the length Lc of the chamber, and remains continuous for the length Lc of the chamber-which is to say, so that the flow of air breaks the water column into a shower of droplets only outside the chamber 11, after the water column has flowed out of the outlet opening 16.

Optionally, where adequate fan power is available and the pressure drop from the fan to the shower head is not too great, the shower head may be operated with a Weber number in the upper part of the parameter space 62, wherein ($10 \leq We_a \leq 55$). However, in practice, when the available fan power is more limited or there is a larger pressure drop, it is found that satisfactory operation can be obtained also in the lower sub-region 62''' wherein ($5 \leq We_a \leq 10$).

In particular, the apparatus may be operated in a preferred sub-region 62', 62''' of the defined parameter space in the lower part of the Weber number range, wherein ($5 \leq We_a \leq 30$).

Where adequate fan power is available, the apparatus may be operated in the upper part 62' of the preferred sub-region, wherein ($10 \leq We_a \leq 30$).

Figure 19:
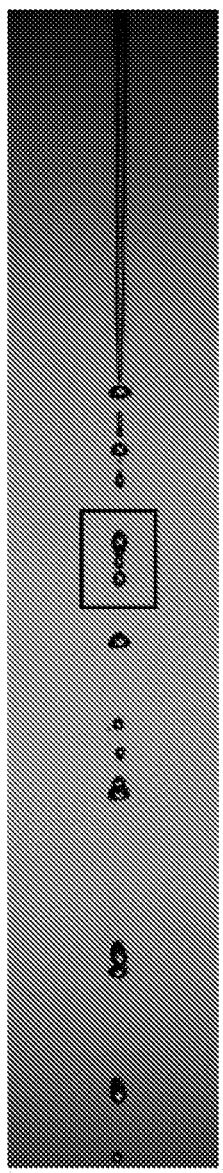
FIGS. 19-21 are photographs of the water column issuing from the test chamber and illustrating, for ease of reference:
  axisymmetric Rayleigh breakup in stagnant air (FIG. 19);
  sinuous wave instability, characteristic of the non-axisymmetric Rayleigh breakup regime (FIG. 20); and
  membrane type instability (FIG. 21).
Figure 20:
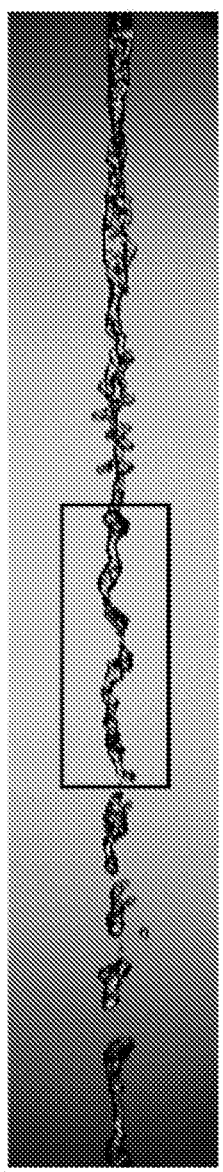
Figure 21:
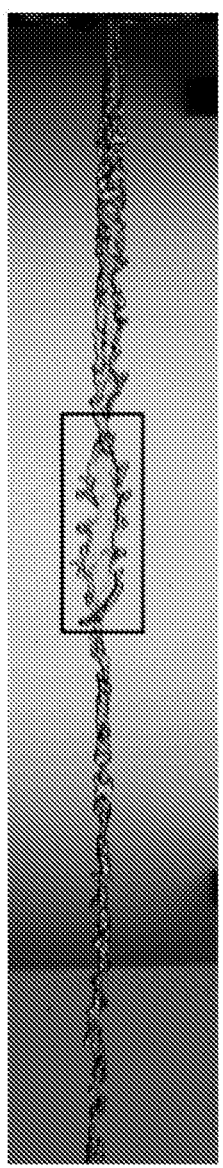

FIG. 15 maps the defined parameter space 62 onto the four distinct breakup regimes (illustrated as regions B1-B4) identified in Z. Farago and N. Chigier, "Morphological Classification of Disintegration of Round Liquid Jets In a Coaxial Air Stream," Atomization and Sprays vol. 2, pp. 137-153, 1992 (referred to herein as Farago and Chigier). In the graph, region B1 represents the region of axisymmetric Rayleigh type disintegration into an axial string of well-defined droplets, as shown in the photograph of FIG. 19. The target region 62, and particularly the preferred sub-region 62', 62''' wherein $We_a \leq 30$, is characterised by non-axisymmetric Rayleigh type disintegration with sinuous wave instability as shown in the photograph of FIG. 20, and lies at a limit of energy transfer between the two fluid streams 41, 51, above which the breakup transitions to the membrane-type breakup regime of region B2. The membrane-type region is characterised by the formation of membrane or sheetlike structures, as can be seen in in the photograph of FIG. 21, which disintegrate to produce smaller droplet sizes. In the less preferred sub-region 62" such structures are more evident. At higher Weber numbers the breakup transitions to the fibre type region B3, or below the threshold Reynolds number boundary, the super-pulsating sub-mode region B4.

Figure 22:
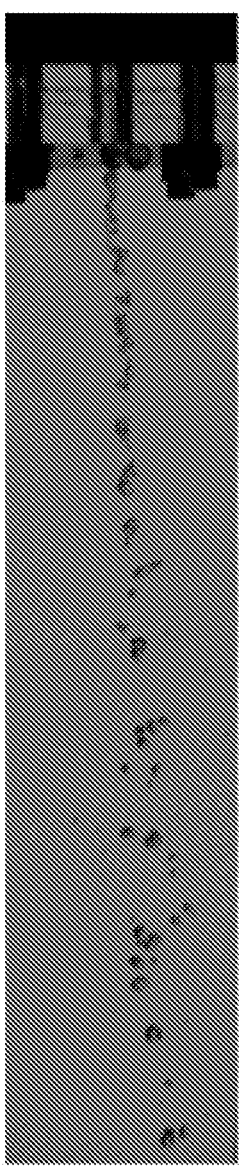
Figure 23:
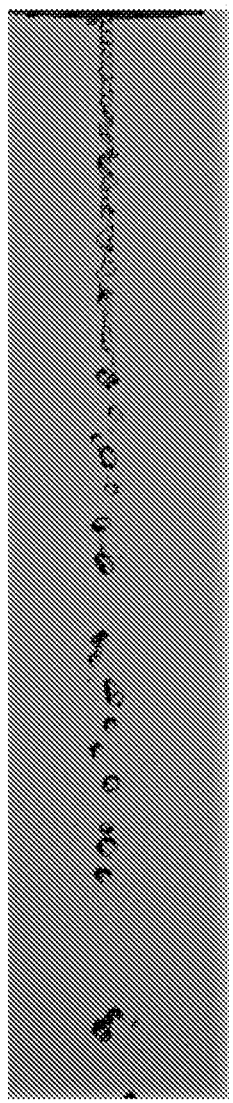
Figure 24:
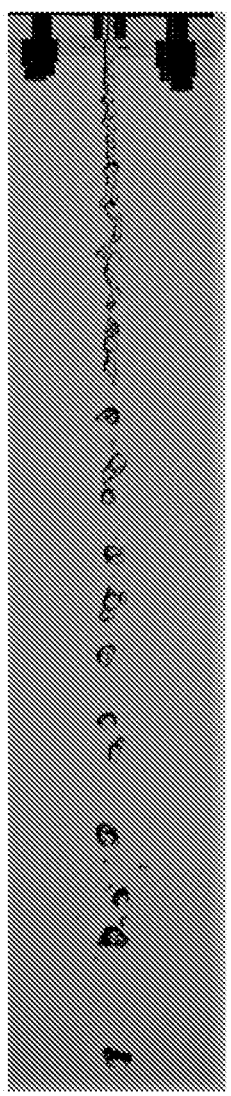
Figure 25:
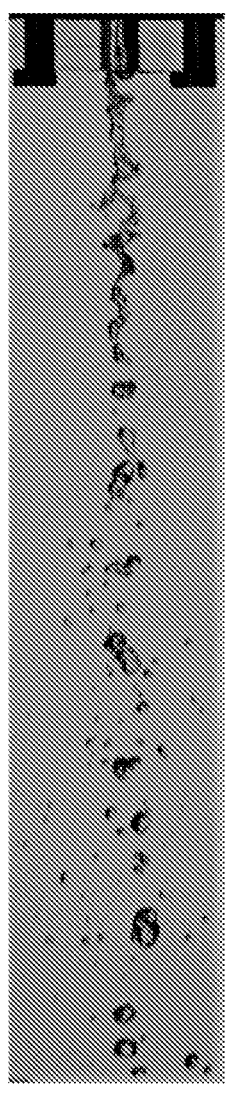

The target regime 62 can be characterised as a combination of axisymmetric (varicose) and non-axisymmetric or sinusoidal modulation of the water column, but, in its preferred sub-region 62', 62''', with no or little evidence of membrane structures which begin to develop at higher energies. For convenience, the target region 62 and particularly the preferred sub-region 62', 62''' will be referred to as the non-axisymmetric Rayleigh breakup regime, following the nomenclature of Farago and Chigier. In the target region 62 and particularly the preferred sub-region 62', 62''', the water column 41 develops to a complex form before disintegrating just beyond the outlet into relatively large droplets on diverging trajectories, as shown in the photographs of FIG. 22 and FIG. 28.

In a conventional, water-only shower head, a single nozzle will produce a fine jet of water which is experienced by the user as a point impact on the body. Numerous such nozzles are therefore required to produce a voluminous spray to cover a substantial area of the body.

As known in the art, by entraining water droplets in a moving airflow, it is possible to maintain the momentum of the droplets until the point of impact on the body, so that a much smaller volume of water can be used to deliver a shower experience comparable with that of a water-only shower using perhaps two or three times the volume of water. The use of a mixing chamber 11 makes it possible to transfer energy from the airflow to the water so as to disintegrate the water stream 41 and entrain the resulting droplets in the airflow.

Although the novel shower head produces a smaller proportion of smaller droplets than the WO'210 shower head, using the same blower 5 (an ebm-papst RV45-3/24S fan) as used in the tests on "Shower Head A" as described in WO'210 to the present applicant, the relatively larger droplets are still well distributed to give the impression of a voluminous spray. That is to say, from a relatively small number of chambers 11, a spray is formed wherein the droplets are sufficiently well distributed to impact with even intensity over the whole section area of the spray as it contacts the user's body. The moving airflow helps to maintain the momentum of each droplet as the droplet travels from the outlet 16 of the chamber 11 to the point of impact.

Since there is a smaller proportion of smaller droplets to provide visual definition to the spray, the user's experience is more strongly dependent on the momentum and distribution of the relatively larger droplets that make up most of the spray.

In this respect the invention recognises that, where a voluminous spray must be produced from relatively few mixing chambers 11 using only a modest airflow, it is important for the droplets produced by each mixing chamber to be urged, not only along the axial direction Xc of the mixing chamber 11 (in which direction their momentum is conserved by the moving airflow), but also away from the axis Xc. In this way a small number of individual sprays, each produced by a single mixing chamber, can broaden and combine to produce the desired, even impact over a substantial area of the body.

The invention further recognises that the perturbation of the water column 41 characteristic of the relatively narrow, non-axisymmetric Rayleigh breakup regime in the defined parameter space 62, in combination with the moving airflow can generate an off-axis force vector which, as the water column 41 disintegrates, urges the droplets in random directions away from the chamber axis Xc, widening the spray rapidly to form a cloud of droplets as it travels away from the chamber outlet 16.

Moreover, the invention recognises that, as long as there is sufficient dynamic coupling and constructive interaction between the two fluid streams 41, 51 within the mixing chamber 11 to generate the desired perturbation, the droplets formed in this way in the primary mode can be entrained effectively in the airflow from the mixing chamber outlet 16 even when formed externally of the chamber 11.

By carefully controlling the modulation of the water column 41 so that the water column remains continuous (i.e. intact, so that it does not break up into droplets) for the entire length Lc of the chamber 11, while selecting the length Lc and diameter Dc of the chamber 11 to ensure that the dimensional envelope 61 of the water column 41 is contained within the chamber 11 and spaced apart from the chamber wall 12 at all points along its length Lc, the secondary mode of droplet formation can thus be avoided while maintaining adequate downstream spray volume and particle momentum.

In combination, based on the same air and water flow rates as described for the WO'210 shower head, these effects result in a voluminous spray with a narrower droplet size and velocity distribution as shown in FIGS. 32 and 34, making it possible to bathe the body while keeping the hair dry.

Further advantageously, it is found in tests that the noise emitted from the novel shower head is somewhat reduced relative to that of the WO'210 shower head, as shown in Table 2. This is believed to result from the absence of the secondary mode of droplet formation by thin film disintegration, which generates noise as water flowing along the chamber wall is detached and re-entrained in the airflow at the outlet of the prior art showerhead.

Figure 26:
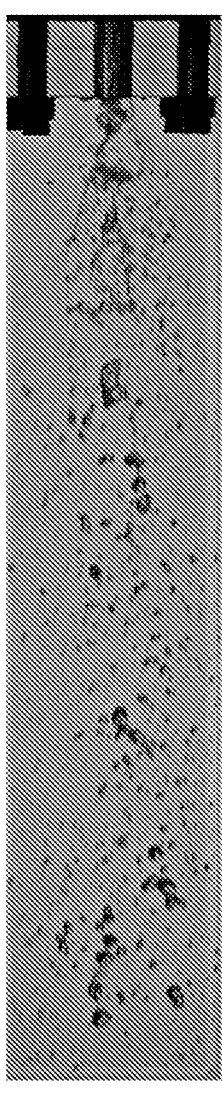

The degree of coupling between the two fluid streams 41, 51 depends inter alia on the length Lc of the chamber 11 and its diameter Dc. The smaller the diameter Dc, the more strongly constrained is the outer flow 51 and so, the greater the coupling between the two fluids 40, 50; however, diameter Dc and length Lc are interdependent since the column 41 diverges from the chamber axis Xc with increasing distance from the water inlet 14. Thus, if a relatively long chamber 11 is selected as shown in the experiment of FIG. 26, the water column 41 may attach to the chamber wall 12 resulting in secondary droplet formation by thin film detachment at the chamber outlet 16. By increasing the chamber diameter Dc (FIG. 22) the dimensional envelope 61 is moved back inside the chamber wall 12 so the secondary mode is avoided.

Test Apparatus

FIG. 18 shows a test apparatus 70 which was configured in accordance with an embodiment of the invention in its first aspect. The test apparatus includes an experimental mixing chamber 711, referred to as the test chamber, as shown in more detail in FIGS. 16 and 17.

The test chamber 711 was supplied with water from a water supply passage 719 via a circular water inlet 714, and with air from a plenum chamber 722 via an air inlet 713 surrounding the water inlet 714.

The air inlet 713 was divided into radially inwardly convergent air inlet passages by radial guide vanes 723 to prevent the air from swirling around the chamber axis Xc. It should be noted that the section of FIG. 17 is taken through two diametrically opposed guide vanes 723, which is why the air inlet 713 appears to be solid.

The test chamber 711 was constructed with the water inlet 714 in two alternative diameters $d_w$, 2 mm and 3 mm, while the overall length Lc of the test chamber 711 was variable by means of interchangeable extension plates 71 of different thicknesses. Each extension plate 71 included a laser cut and polished cylindrical through-hole defining part of the chamber wall and hence length Lc. The extension plates 71 were made from acrylic with polished sides so that the behaviour of the water column inside the chamber could be observed and photographed as shown in FIGS. 19-30.

Water was gravity fed to the water inlet 714 via a header tank 72 which was maintained at a constant water level using a float valve connected to the mains water supply 73. The water flow rate from the tank was controlled using a needle valve 74 and measured using a water flow sensor 76. The flow sensor 76 generated a pulse signal at a frequency proportional to the water flow rate, which was measured as a digital pin interrupt on a microcontroller 75. The computer 83 converted the number of digital pin interrupts on the microcontroller 75 to flow rate based on the calibration provided by the flow sensor manufacturer.

Air was supplied to the plenum chamber 722 from a compressed air supply 84 at a flow rate regulated using a needle valve 77. The air flow rate was measured using a air flow sensor 78 producing an output current, proportional to the air flow rate, which was measured by a current measuring module 79 powered by a power supply 80. The measured current value was converted into flow rate using LabView® running on a computer 83.

The spray produced by the test chamber 711 was captured using an Imperx GEV B1921 CCD camera 81 and an LED light panel 82 fitted with a stand-off diffuser placed behind the spray for illumination. This allowed a shutter speed of 125 us to be used to capture sharp images of the spray as shown in FIGS. 19-30. The CCD camera 81 was fitted with a 50 mm Nikon® Nikkor® f/1.8 lens which was mounted using a C-mount to F-mount adapter. Additionally this lens used a manual aperture. The aperture was closed as much as possible, whilst still maintaining suitable image lighting, to try to get all the drops in the image into focus.

An Oxford Lasers VisiSize D30 imaging apparatus 81, 85, 86, 87 was used to measure the size and velocity of the droplets emitted from the outlet of the test chamber 711 by particle/droplet image analysis (PDIA) to generate the particle diameter/velocity data sets presented in FIGS. 31-34. For this purpose the light panel 82 was removed and replaced with an Oxford Lasers Firefly 300W infra-red laser 85, and the camera 81 was fitted with a microscopic objective lens 86 and a timing unit 87 to synchronise the camera shutter speed with the pulse frequency of the laser.

The laser was pulsed at about 1%-2% of full power and a frequency of around 5 μs-6 μs and the diffused and collimated beam directed through the spray to produce pairs of sequential images which were detected by the camera 81. Particles in each pair were identified by an image-pairing algorithm and their velocity determined based on the distance travelled.

The pulsed laser provides sharp images from which the particle diameter was determined by counting the number of pixels representing each drop and converting to droplet diameter based on a calibration file corresponding to the lens magnification. Defocused drops were identified by a surrounding "halo" and their size determined by the manufacturer's algorithm based on the greyscale gradient and radial width of the "halo". Smaller drops have a shorter acceptable defocus distance and so are more likely to be rejected, resulting in a bias towards larger drops. To compensate for this, the imaging apparatus was arranged to adjust the probability density function output based on the manufacturer's statistical weighting factor.

Droplet Size and Velocity

The test apparatus was run to generate droplet size and velocity data and to provide photographs of the spray. During these tests, water was supplied at a volume flow rate of 1 l/min (one litre per minute) to the 3 mm water inlet, and at a lower volume flow rate to provide an equal water flow velocity $u_w$ from the 2 mm water inlet.

FIGS. 22-30 illustrate how the geometric and flow parameters can be adjusted to control the breakup regime within the target parameter space 62, and particularly its preferred sub-region 62'.

FIG. 22 shows the spray obtained using a 2 mm water inlet diameter and 8 mm chamber diameter, wherein the water and air flow rates were selected to define an approximate Reynolds number $Re_w \approx 5246$ and aerodynamic Weber number $We_a \approx 26$. It can be seen that the water column disintegrates outside the chamber outlet to form a spray of evenly sized droplets which begin to move away from the chamber axis, with relatively few smaller droplets being formed.

FIGS. 23-26 show the spray obtained using a 3 mm water inlet diameter and 8 mm chamber diameter, wherein the water and air flow rates were selected to define an approximate Reynolds number $Re_w \approx 7950$ and aerodynamic Weber number $We_a \approx 23$. As the chamber length increases, the water column begins to attach to the chamber wall resulting in more small droplets (FIG. 25) and, finally, fully transitions to the secondary mode with most of the droplets being produced by thin film detachment from the chamber wall (FIG. 26).

FIGS. 27-30 show the spray obtained using a 2 mm water inlet diameter and 7 mm chamber diameter, wherein the water and air flow rates were selected to define an approximate Reynolds number $Re_w \approx 5250$ and aerodynamic Weber number $We_a \approx 24$. At shorter chamber lengths the water column disintegrates downstream of the chamber outlet to form evenly sized droplets which move away from the chamber axis, with relatively few smaller droplets present (FIG. 28). Increasing chamber length results in attachment of the water column and eventually to a spray in which the secondary mode is dominant (FIG. 30).

FIGS. 32 and 34 present a data set obtained by operating the test apparatus in accordance with the first aspect of the invention within the preferred parameter range 62' so that the water column remained intact and spaced apart from the chamber wall for the length Lc of the test chamber 711, breaking into primary droplets 60 downstream of the chamber outlet. The secondary mode of droplet formation by thin film detachment was substantially absent.

FIG. 32 shows the droplet diameter Dp in microns mu relative to droplet velocity Vp in metres per second m/s, with the number of particles detected Np indicated by greyscale gradient as shown. The data set shows relatively little spread in particle velocity, and a reduced proportion of smaller droplets compared with the test of FIG. 31 in which the test chamber was operated in accordance with WO'210 and was found to generate a significantly large proportion of droplets in the secondary mode.

FIGS. 33 and 34 present the two data sets by particle velocity versus number of droplets detected, Np, as a percentage % of the total sample size. The S-shaped curve represents the cumulative total on the right-hand scale from 0-100%.

Sound and Spray Force

Although previous work carried out on the WO'210 shower head suggests that the noise produced by a water-in-air shower head is suppressed by a convergent nozzle at the outlet of the mixing chamber, surprisingly it is found that a parallel sided mixing chamber without a final, convergent nozzle, and configured moreover to produce disintegration of the water flow externally of the chamber 11, may produce less noise than what has previously been considered an optimal chamber shape as taught by WO'210. This is believed to be due to the absence of thin film detachment, which may account for a substantial proportion of the previously observed noise, in combination with the narrowly defined parameter space in the region of non-asymmetric Rayleigh type breakup.

The WO'210 shower head relies upon breakup within the mixing chamber to accelerate the droplets in the expanding airflow, and in this way transfers energy from air to water and so maintains droplet momentum downstream of the shower head. This produces a voluminous shower with relatively little water, while the impact of the droplets against the user's skin is surprisingly high and generates a user experience comparable with a conventional shower using far more water. However, this operating principle results in wetting of the chamber wall by at least a proportion of the primary droplets formed within the chamber, and thus necessarily produces a substantial proportion of relatively small droplets in the secondary mode.

In contrast, the operating parameters of the novel shower apparatus are selected to constructively couple the two fluid streams 41, 51 within the mixing chamber 11 to generate a perturbation within the non-axisymmetric Rayleigh parameter space 62, so that the water column 41 does not contact the chamber wall and remains intact until downstream of the chamber outlet 16. Surprisingly it is found that in this way, it is still possible to obtain an off-axis movement of the primary droplets and to transfer sufficient energy between the two fluid streams to maintain primary droplet momentum at the target distance downstream of the shower head to produce an impact force comparable with that of the WO'210 shower head, yet without the secondary mode of droplet formation that results from breakup within the prior art mixing chamber.

Further tests were carried out to quantify the noise and spray force produced by the novel shower head.

A first test (Test 1) was carried out with a shower head having 11 nozzles, configured and operated in accordance with the first aspect of the present invention within the preferred parameter range 62' so that the water column remained intact and spaced apart from the chamber wall for the length Lc of each chamber 11.

A second test (Test 2) was carried out with "Shower Head A" as disclosed in WO'210, which was operated as taught therein with a proportion of the droplets being produced by thin film detachment from the chamber outlet.

For each test, each respective shower head was supplied with air from a compressed air supply at a total volume flow rate of 350 l/m+/−5 l/m, and water from a water pump at a total volume flow rate of 5 l/m+/−0.1 l/m.

The air flow rate was measured using a calibrated flow sensor. The water mass flow rate was measured as the mass of water flowing into a container over a period of one minute, with an error (percentage difference) of <2%.

The tests were repeated to obtain comparative sound level data, presented in Table 2, and spray force data, presented in Table 3.

For the sound level tests, background noise was measured both with and without the water pump and other ancillary equipment in operation at three different horizontal distances from the face plate of each respective shower head.

For the spray force tests, each shower head was arranged to discharge the spray vertically downwardly onto the weighing platform of a 10 kg digital balance, located at 45 cm+/−1 cm below the face plate of the shower head. The spray force was measured from the digital balance, with measurement error of <7% calculated as a percentage difference of multiple readings.

It can be seen that the novel shower head (Test 1) generated a comparable spray force with lower noise emissions compared with Shower Head A (Test 2).

TABLE 2

| | Background | Ancillary | Ancillary noise + water splash noise | | Total noise reading with shower on | |
|---|---|---|---|---|---|---|
| | noise (dBA) | noise (dBA) | Distance (m) | Reading (dBA) | Distance (m) | Reading (dBA) |
| Test 1 | 30.2 | 60.2 | 0.15 | 63.3 | 0.15 | 84.7 |
| | | | 0.30 | 63.2 | 0.30 | 81.5 |
| | | | 0.45 | 63.8 | 0.45 | 80.9 |
| Test 2 | 30.0 | 60.8 | 0.15 | 66.8 | 0.15 | 87.4 |
| | | | 0.30 | 65.7 | 0.30 | 82.2 |
| | | | 0.45 | 64.2 | 0.45 | 81.5 |

TABLE 3

|  | Air flow rate (l/m) | Calculated water flow rate (l/m) | Average spray force (N) |
|---|---|---|---|
| Test 1 | 350 ± 5 | 4.01 | 0.75 |
|  |  | 4.98 | 0.86 |
|  |  | 6.01 | 1.00 |
| Test 2 | 350 ± 5 | 3.97 | 0.74 |
|  |  | 5.02 | 0.87 |
|  |  | 5.97 | 1.06 |

Structural Features of the Shower Head

The chamber axes Xc may be parallel or non-parallel. In order to produce a wider spray, the chamber axes Xc may diverge in the direction of flow, away from the outlet side 18 of the shower head, as shown. In the illustrated example, the shower head produces a spray along a mean, central axis Xs, wherein the axes Xc of the radially innermost chambers 11 diverge from the central axis Xs by an angle α1, and the axes Xc of the radially outermost chambers 11 diverge from the central axis Xs by a relatively larger angle α2. Alternatively the chamber axes Xc could be convergent in the flow direction. The radially innermost and outermost chambers may be of equal or slightly different diameters, as shown.

Referring now to FIGS. 2-7, the shower head 10 preferably includes first guide surfaces 23' which are arranged at or upstream of the air inlet 13 to guide the air to flow into the chamber 11 substantially without swirling about the chamber axis Xc, which otherwise could interfere with the desired perturbation of the water column 41 and move it away from the chamber axis.

Figure 5:
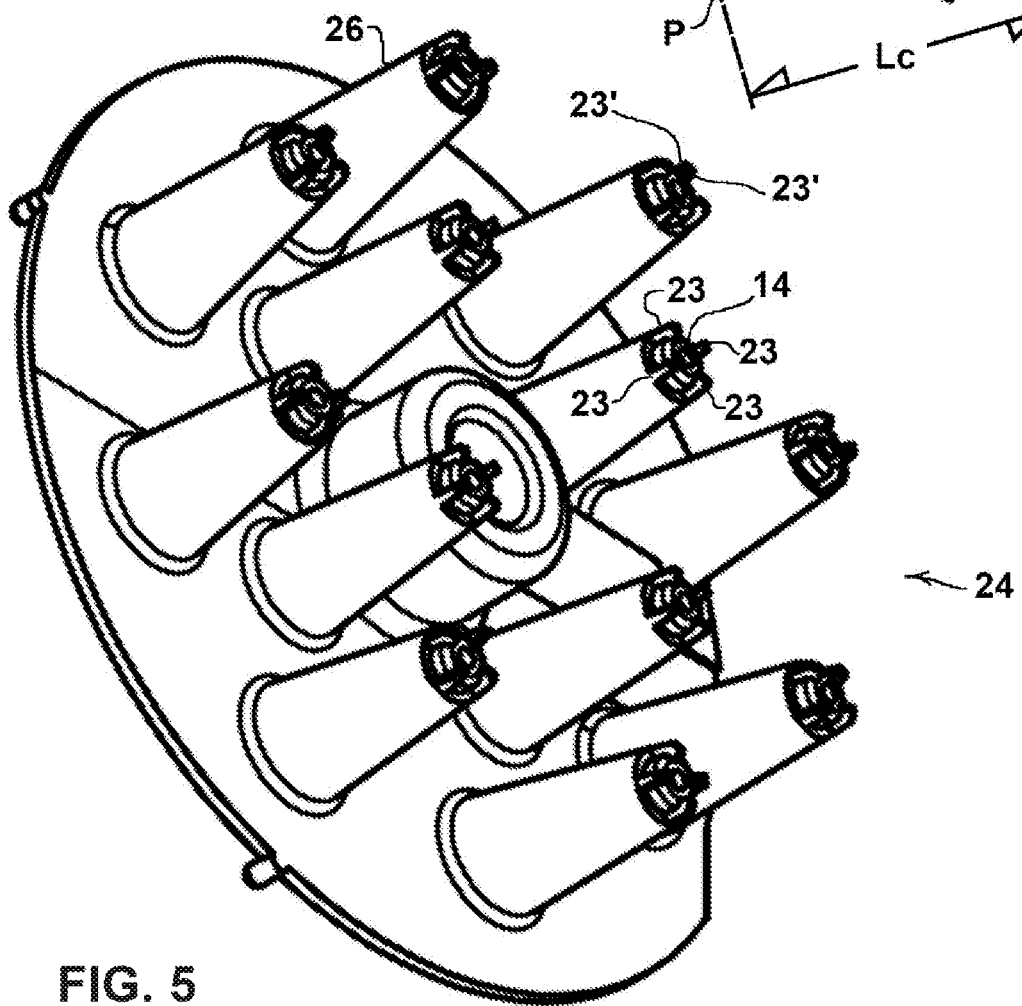
FIGS. 5 and 6 show, respectively, the front and rear sides of the water distribution plate of the shower head.
Figure 6:
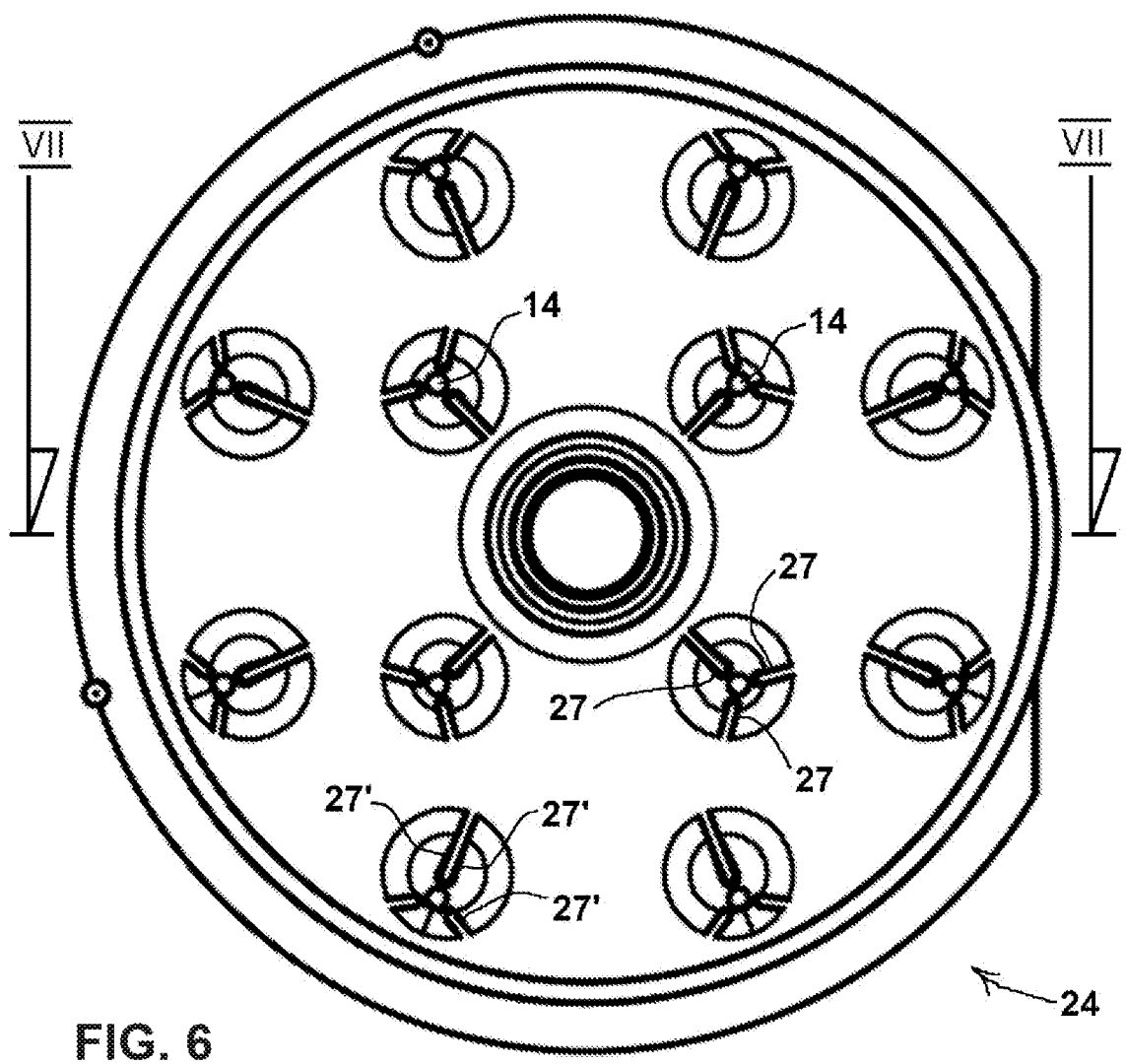
Figure 7:
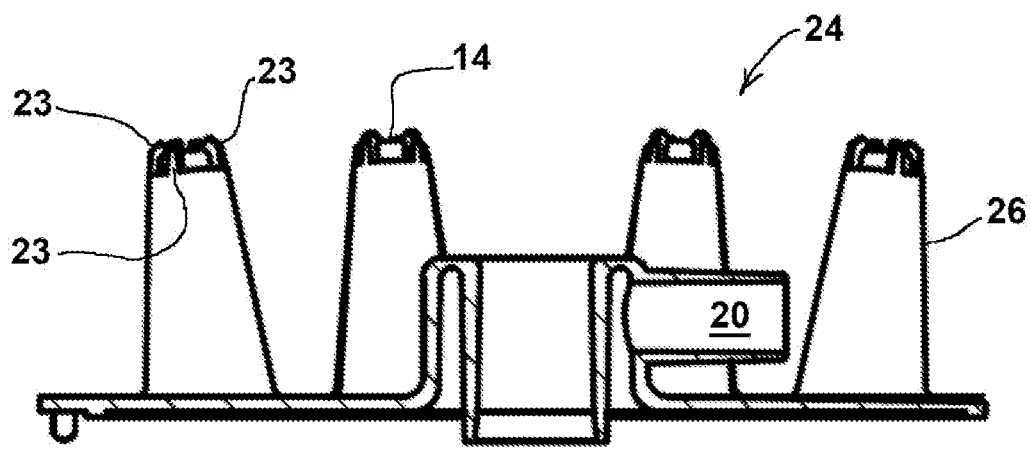
FIG. 7 is a section through the water distribution plate at VII-VII of FIG. 6.

As best seen in FIG. 5, the first guide surfaces 23' may form opposite sides of guide vanes 23 which are equally angularly spaced to surround each water inlet 14. In the illustrated embodiment there are four guide vanes surrounding each water inlet. The guide vanes and water inlet may be moulded integrally as a first part 24 of the shower head 10, which may form the water distribution plate as shown in FIGS. 5, 6 and 7. In the illustrated embodiment, the water distribution plate defines one side of a water distribution space 25 (FIG. 3) through which water flows from the water inlet 20 via flowpaths defined within the conical structures 26 to the short, cylindrical water flowpath 19 terminating at the water inlet 14 at the tip of each structure.

Figure 3:
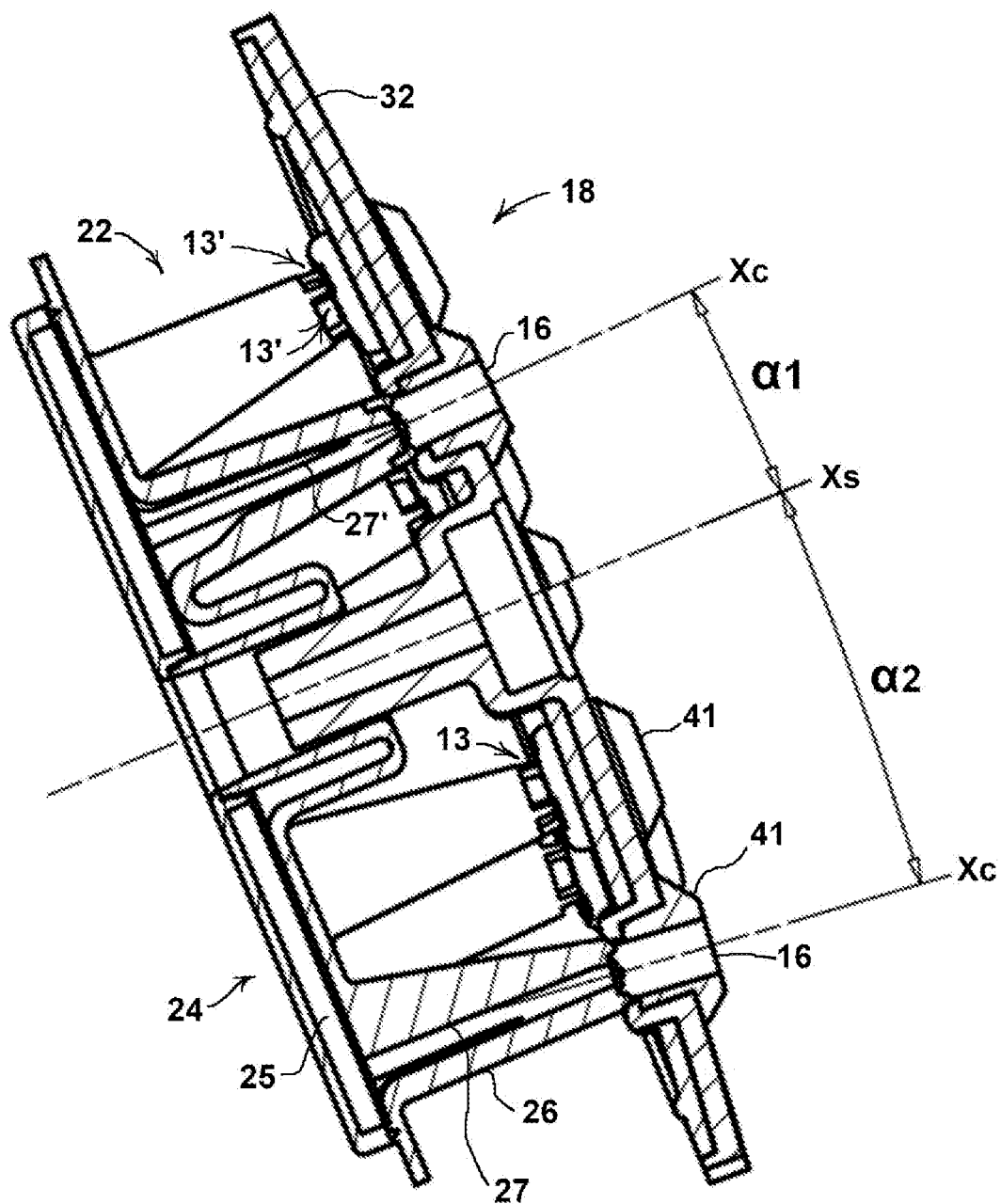
FIG. 3 is a section through the shower head at III-III of FIG. 2.

As best seen in FIG. 3, the guide vanes 23 may divide the air inlet 13 into a plurality of air inlet passages 13' which converge towards the chamber axis Xc substantially without revolution about the chamber axis, so that each air inlet passage 13' defines a mean airflow path extending through the air inlet passage in a plane (FIG. 4, FIG. 14) containing the chamber axis Xc.

Additionally, second guide surfaces 27' may be arranged at or upstream of the water inlet 14 to guide the water to flow into the chamber 11 substantially without swirling about the chamber axis Xc, which also could interfere with the desired perturbation of the water column 41. In the illustrated embodiment, as shown in FIG. 3 and FIG. 6, the second guide surfaces 27' are formed as the opposite sides of internal ribs 27 extending along the axial direction of the flowpath within each of the conical structures 26.

Turning now to the second aspect of the invention, as discussed above, the shower head 10 is arranged to conduct water to the water inlet 14 at the first end of each chamber 11 so that the water flows through the chamber 11 along the chamber axis Xc and is ejected from the outlet opening 16.

Figure 2:
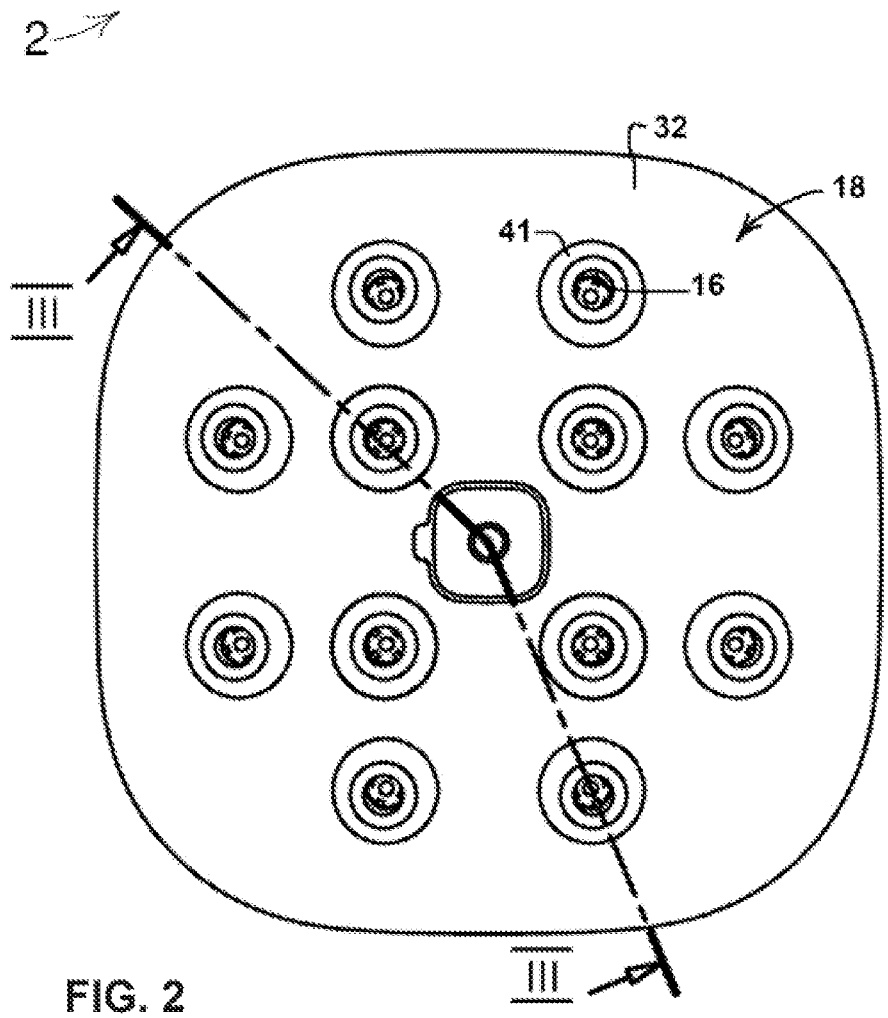
FIG. 2 shows the outlet side of the shower head.

Referring to FIGS. 2, 3 and 4, although an optional feature in embodiments in accordance with the first aspect of the invention, in accordance with the second aspect of the invention, each chamber 11 includes an outer moulding 30 and an inner moulding 40. The outer moulding 30 is formed from a first, non-elastomeric plastics material and defines an outer chamber wall 31 extending along the chamber axis Xc, as shown in FIG. 4. The outer chamber wall 31 is individual to the respective chamber 11 and surrounds the respective chamber axis Xc, so that when considered in a plane normal to the chamber axis, the outer chamber wall 31 encircles the chamber axis Xc and divides the respective chamber 11 from the other chambers 11 of the shower head 10.

Figure 8:
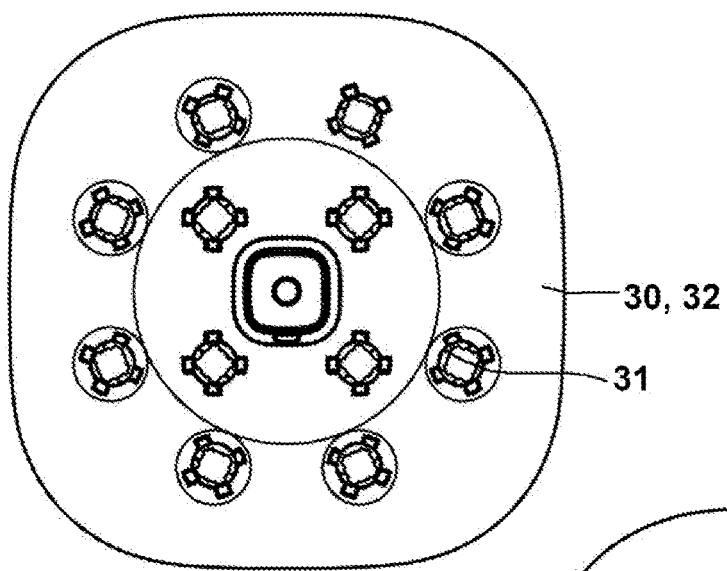
FIG. 8 is a front view of a first, hard plastics moulding defining a fascia plate of the shower head.
Figure 9:
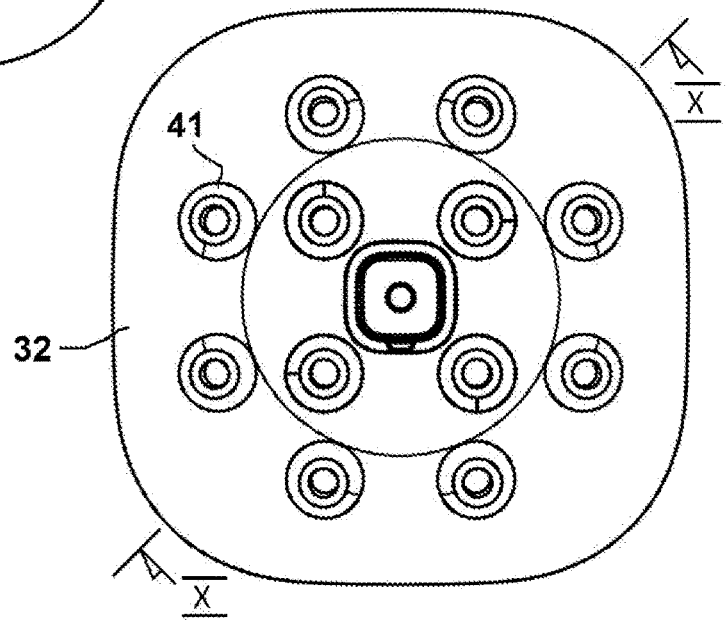
FIG. 9 is a front view, corresponding to FIG. 8, of the fascia plate after forming the elastomeric chamber linings in a second moulding step.
Figure 10:
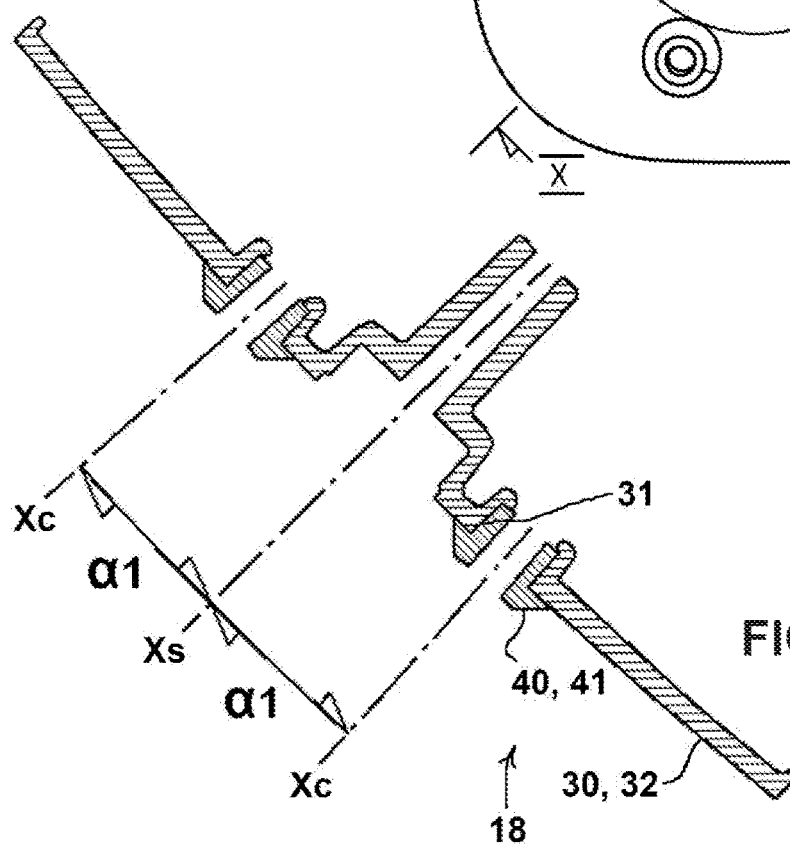
FIG. 10 is a section at X-X through the finished fascia plate of FIG. 9.

Referring also to FIGS. 8-10, in the illustrated embodiment, the outer moulding 30 of each chamber 11 is formed as a second part 32 of the shower head which forms the fascia plate at its outlet side 18.

The inner moulding 40 is formed from a second, elastomeric plastics material and forms a lining of the chamber 11 which extends along the chamber axis Xc and is surrounded by the outer chamber wall 31. Thus, each inner moulding 40 forms an individual lining within its respective outer chamber defined by the outer chamber wall 31.

As shown, the inner moulding 40 may extend beyond the outer moulding 30 along the chamber axis Xc to define an elastomeric nozzle 41, the outlet opening 16 being formed in the nozzle 41.

In embodiments in accordance with the second aspect of the invention, the chamber axes Xc are non-parallel. The elastomeric inner moulding 40 makes it possible to form the chambers 11 in accordance with the method of the second aspect of the invention, despite the non-parallel chamber axes Xc.

Figure 11:
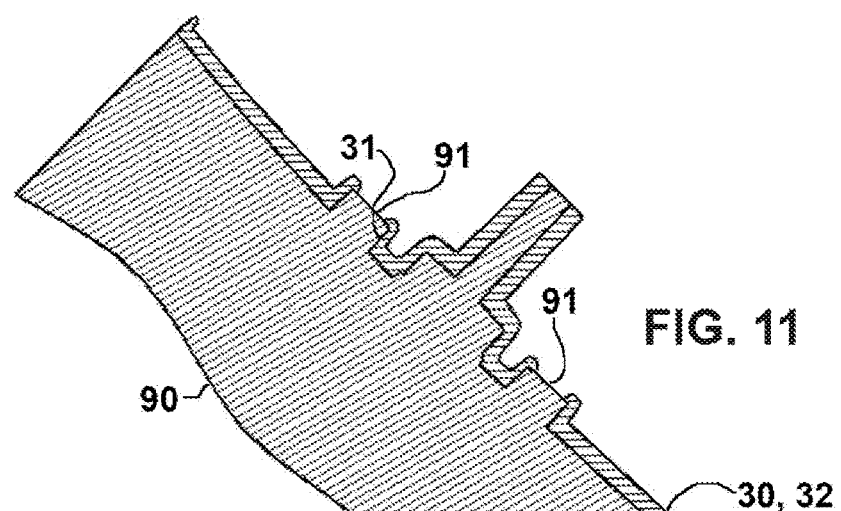
FIG. 11 is a section through the first moulding of FIG. 8 and a corresponding, first mould tool, taken in the same plane X-X as FIG. 10.
Figure 12:
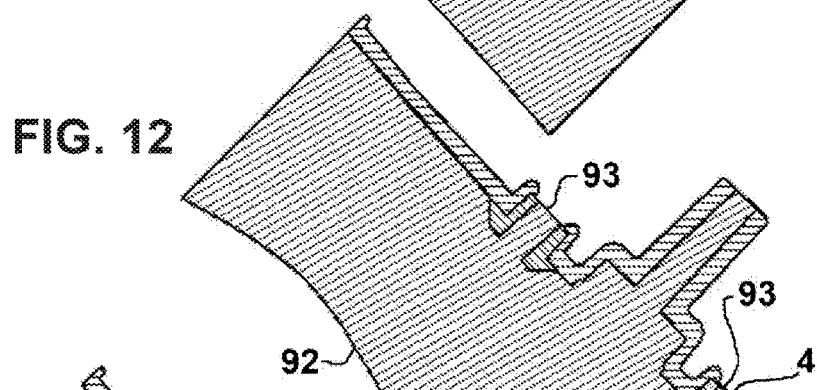
FIG. 12 is a section through the finished fascia plate of FIG. 10 and a corresponding, second mould tool, taken in the same plane X-X.
Figure 13:
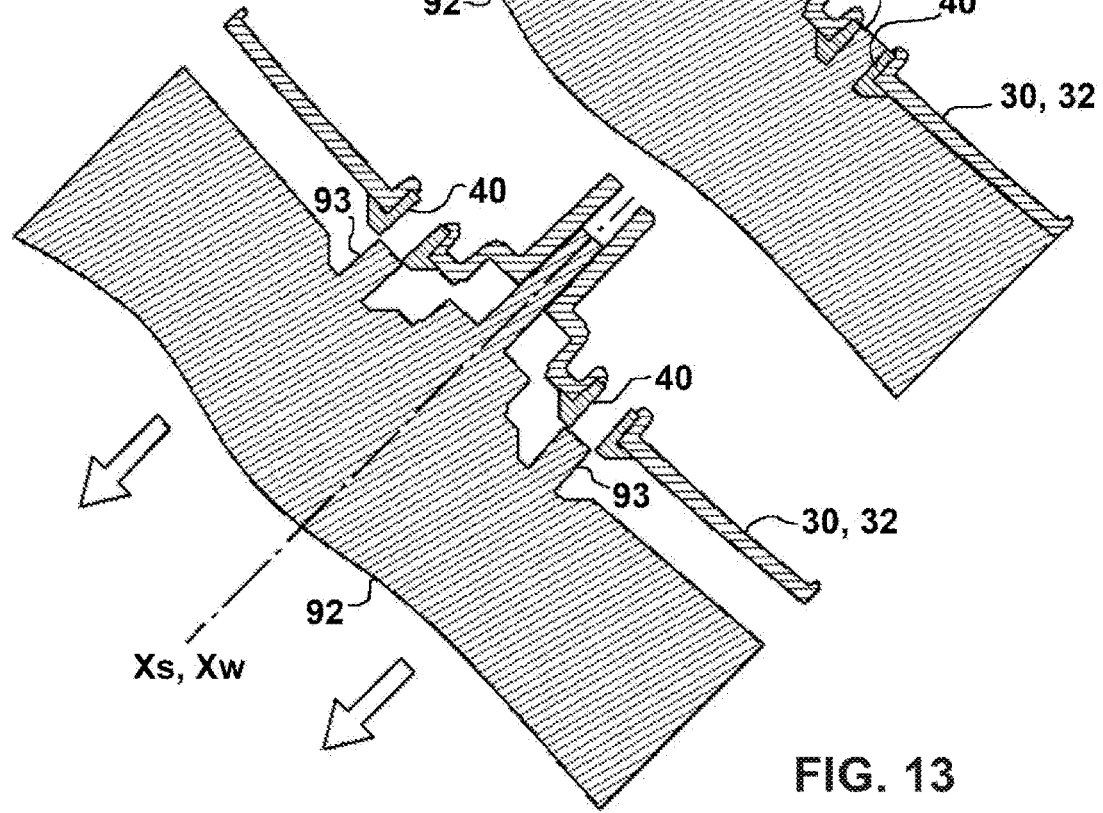
FIG. 13 is a section corresponding to that of FIG. 12 during withdrawal of the second mould tool.

Referring to FIGS. 11-13, the method of the second aspect includes forming the outer and inner mouldings 30, 40 of each chamber 11 by means of mould tooling, which in the illustrated embodiment includes a first mould tool 90 and a second mould tool 92. Each mould tool may be withdrawn from the moulding in a withdrawal direction, which may be in the flow direction of the shower head as shown by the arrows in FIG. 13.

The first mould tool 90 may include a plurality of mould cores 91, each of which defines the outer chamber wall 31 of a respective one of the chambers 11, while the second mould tool 92 includes a plurality of mould cores 93, each of which defines the inner chamber wall 12 of a respective one of the chambers 11.

The mould cores 91 of the first mould tool 90 may be withdrawn simultaneously from all of the chambers 11 along a withdrawal axis Xw of the first mould tool, which may lie along the mean central axis Xs of the shower head.

For each of the chambers 11, when considered in a plane containing both the withdrawal axis Xw of the first mould tool 90 and the axis Xc of the respective chamber 11, the outer chamber wall 31 of the chamber 11 may be represented by a line on either side of the chamber axis Xc.

When so considered, to facilitate the withdrawal of the first mould tool 90, this line, on the side of the chamber 11 positioned between the chamber axis Xc and the withdrawal axis Xw, does not diverge from the withdrawal axis Xw in the withdrawal direction, while the line on the opposite side of the chamber 11 does not converge with the withdrawal axis Xw when projected in the withdrawal direction.

After forming the outer moulding 30, the inner moulding 40 of each chamber is formed by means of the mould tooling, specifically the second mould tool 92.

Unlike the first mould tool, the mould cores 93 of the second mould tool 92 may be obstructed in the withdrawal direction by the inner moulding 40.

After forming the inner moulding 40, the plurality of mould cores 93 of the second mould tol 92 are withdrawn simultaneously from the plurality of chambers 11 along a single, common withdrawal axis Xw of the second mould tool.

The withdrawal axis Xw of the second mould tool 92 is non-parallel with at least some and, optionally, all of the chamber axes Xc. Said withdrawal axis Xw may be the same as that of the first mould tool 90, and, as shown, may lie on the mean central axis Xs of the shower head which defines the mean direction of the spray 60 in use.

The inner moulding 40 may vary in thickness around the chamber axis Xc, filling the space between the inner wall 12 of the chamber and its outer wall 31 whose position is dictated by the draft requirements of the first mould tool 90.

As illustrated, the inner moulding 40 may define a substantially cylindrical inner wall 12 of the chamber 11.

Where the shower head 10 includes a first part 24 and a second part 32 which are assembled together, the water inlet 14 of each chamber 11 may formed in the first part 24 as explained above, and the plurality of chambers 11 in the second part 32.

In this arrangement, as also discussed above, the first part 24 may include, for each respective chamber 11, a respective set of guide vanes 23 which are symmetrically disposed about the chamber axis Xc and which define first guide surfaces 23' which are configured to guide the air to flow into the chamber 11 substantially without swirling about the chamber axis Xc.

In such arrangements, as best seen in FIG. 4, each guide vane 23 may define a respective, first abutment surface 23", while the outer moulding 30 is exposed to define second abutment surfaces 33 of the second part 32 which abut the first abutment surfaces 23" of the first part 24 when the first and second parts 24, 32 are assembled together. This positively locates the two parts in the correct geometric relation which ensures correct operation of the chamber.

Design Calculations

The following calculations are presented purely by way of example, whereby a shower head in accordance with the first aspect of the invention may be designed based on the total fluid flow rates and the number of chambers 11.

For this purpose it is assumed that air and water densities remain constant, and so the volume fluxes of both fluids are the same at all points. The effect of gravity on water velocity $u_w$ is ignored. Also, for simplicity, the wall thickness of the water inlet structure is ignored, and it is assumed that the water inlet is circular, the chamber 11 is cylindrical, and the water column diameter $d_w$ and chamber diameter Dc define, respectively, the inner and outer diameters of the air inlet 13 in the plane P of the water inlet 14, from which the cross-sectional area of the air inlet 13 is determined.

Thus, for a set of design parameters $d_w$ and Dc, the following relationship is obtained between the total volume flow rates Qa of air and Qw of water, and their respective fluid velocities $u_a$ and $u_w$ in the plane P.

$$Qw = \frac{\prod \cdot d_w^2 \cdot u_w}{4}$$

$$Qa = \frac{\prod \cdot (Dc^2 - d_w^2) \cdot u_a}{4}$$

Dc can be used to determine $u_a$, which sets the Weber number $We_a$. Dc is also subject to the design constraints set out below.

The amplitude a(t) of a surface wave of a given frequency f and initial amplitude $a_0$ at a growth rate ω at time t after a small section of the liquid jet leaves the nozzle is assumed to be given by $$a(t) = a_0 \cdot e^{\omega t}$$

(Y. Morozumi and J. Fukai, "Growth and structures of surface disturbances of a round liquid jet in a coaxial airflow," *Fluid Dynamics Research*, vol. 34, p. 224, 2004.)

The jet surface is composed of surface waves of many frequencies superimposed on each other. At a single frequency, the last mentioned equation may be used to approximate their amplitude, wherein the initial amplitude do defines the surface wave amplitude in the water column 41 at the plane P of the water inlet 14. The constants and variables in this equation may be determined experimentally.

A critical value L* is defined as that value of the chamber length Lc where, at the chamber outlet 16, the dimensional envelope 61 has a diameter D*, referred to hereafter as the critical diameter, equal to the diameter Dc of the chamber 11. Thus, to maintain the water column 41 in spaced relation from the chamber wall 12, the critical value L* of the chamber length Lc represents the maximum limit of chamber length for a given set of design parameters.

The critical diameter D* is related to a (t) by the following equation:

$$D*(t) = d_w + 2a'(t)$$

where a'(t) is the maximum a(t) for all frequencies. D*(t) defines the critical diameter of the dimensional envelope 61 at all points along its length.

For any point on the water column 41, a distance Z is defined as the distance along the chamber axis Xc between that point and the water inlet 14 at plane P, and a time t for the time taken for that point to travel through that distance. Thus, at plane P, Z=0.

A time period T is defined as the time taken for a point on the water column 41 to travel from the water inlet 14 at plane P to a plane, normal to the chamber axis Xc, at which Z=L*.

The terms Z and t are related by the equation:

$$z(t) = u_w t$$

Experimental results place the value of Lc in the range 3 mm≤Lc≤25 mm. However, the preferred method of obtaining the actual chamber length Lc from L* is to use a factor K, so that $$K = L/L*$$

and $$0.95 \geq K \geq 0.50$$

This ensures that the chamber diameter Dc at z=Lc is always larger than the diameter of the dimensional envelope 61 at the same position.

For a shower head in which the chamber diameter varies along the chamber axis Xc, a formula R(z, θ) may be defined which expresses the radial distance R of the chamber wall 12 from the chamber axis Xc as a function of:

distance Z along the chamber axis Xc from the water inlet 14 at plane P, and an angle θ measured in a plane normal to the chamber axis Xc from an arbitrary axis intersecting the chamber axis Xc in that plane.

The preferred chamber diameter Dc is set by the Weber number $We_a$, and the chamber radius at plane P, which is $$R(x=0, 2\Pi \geq \theta > 0) = Dc/2$$

where R ($x=0$, $2\Pi \geq \theta > 0$) means R when $x=0$ and when $2\Pi \geq \theta > 0$. Thus, R takes two parameters; the first is the distance x downstream along the chamber axis Xc, measured from the water inlet 14, and the second is the angle θ measured in said plane normal to the chamber axis Xc, between a point on the chamber wall 12 and said arbitrary axis in said plane.

In order to ensure that the dimensional envelope 61 is spaced apart from the chamber wall 12 for the entire length Lc of the chamber 11, the shape of the chamber wall 12 may then be selected to satisfy the statement $$2R(z,\theta) > D^*(t), T \geq t \geq 0$$

for all values of Z and θ.

The two parameters Dc and D* are related by $$Dc > \max(D^*(0 \leq t \leq T))$$

which reduces to $$Dc > D^*(T)$$

assuming the growth rate is always positive.

Example Design Calculation

By way of further example, following the approach set out above, the following calculation may be used to design a shower head in accordance with an embodiment of the invention in its first aspect, having 12 chambers with a total water volume flow rate Qw of 5 l/m.

For the purpose of this example, it is assumed that the chambers 11 are cylindrical, all water inlets 14 are of equal diameter $d_w$, and the total cross-sectional area Aw of all water inlets 14 is $3.456 \times 10^{-5}$ m².

The diameter $d_w$ of each water inlet 14 is calculated as $$d_w = \sqrt{\frac{4 \times 3.456 \times 10^{-5}}{12\pi}} = 1.91 \text{ mm}$$

The water velocity $u_w$ is calculated as $$u_w = Q_w/A_w = (8.33 \cdot 10^{-5})/(3.456 \cdot 10^{-5}) = 2.41 \text{ ms}^{-1}$$

The liquid Reynolds number $Re_w$ can then be determined:

$$Re_w = (\rho_w \cdot u_w \cdot d_w)/\mu_w = 6630$$

which is within the target range.

Each air inlet 13 is assumed to have a diameter of 5.5 mm, so the effective total cross-sectional area Aa of the air inlets 13 is calculated as $$Aa = 12\pi \frac{(5.5 \times 10^{-3})^2 - (1.91 \times 10^{-3})^2}{4} = 2.51 \times 10^{-4} \text{ m}^2$$

For the higher preferred parameter range $10 \leq We_a \leq 30$ with constant water flow rate:

$$u_a = \sqrt{\frac{\sigma_w \cdot We_a}{\rho_a \cdot d_w}} + u_w$$

This yields for air velocity $u_a$ a value range: $19.7 \text{ ms}^{-1} \leq u_a \leq 32.4 \text{ ms}^{-1}$ and for the relative velocity $u_{rel}$, defined as the difference between $u_a$ and $u_w$, a value range: $17.3 \text{ ms}^{-1} \leq u_{rel} \leq 30.0 \text{ ms}^{-1}$ Similarly, calculating air velocity with an air flow rate of 330 l/m:

$$u_a = Qa/Aa = (5.5 \cdot 10^{-3})/(2.51 \cdot 10^{-4}) = 22 \text{ ms}^{-1}$$

This value for air velocity is within the range required for a Weber number between 10 and 30. Aa or Qa can be adjusted to place the air velocity in the desired area within this range.

The chamber length Lc in this example calculation has been taken as 8 mm based on experimental observation. From this, we infer that $$L^* \sim (8 \cdot 10^{-3})/0.9 = 8.9 \text{ mm}$$

assuming K=0.9.

If necessary, the surface wave growth rate may be estimated by taking measurements of the critical diameter D* and inserting these into the equation given above:

$$a(t) = a_0 \cdot e^{\omega t}$$

SUMMARY

In summary, in embodiments in accordance with the first aspect of the invention, a shower head 10 is supplied with an annular airflow 51 which surrounds a column 41 of water travelling through a chamber 11 to produce a suspension of water droplets 60 in air. The diameter Dc and length Lc of the chamber 11 and the diameter $d_w$ of the water column 41 are selected in combination with the fluid flow parameters to operate the shower within a defined parameter space corresponding to the non-axisymmetric Rayleigh breakup regime, wherein the water column 41 remains intact and spaced apart from the chamber wall 12 for the entire length Lc of the chamber. The airflow 51 perturbs the water column 41 within the chamber 11 causing it to disintegrate into droplets 60 downstream of the chamber outlet 16. In another aspect, multiple chambers 11 are moulded on non-parallel axes Xc with elastomeric linings 40 facilitating withdrawal of the mould tool.

The illustrated embodiment exemplifies the present invention in both its first and second aspects. In alternative embodiments however, a shower head in accordance with the first aspect of the invention need not include the non-parallel chamber axes, inner and outer mouldings, or other features particular to the second aspect. For example, a shower head in accordance with the first aspect of the invention may include inner and outer mouldings but with either parallel or non-parallel chamber axes Xc.

Similarly, in further alternative embodiments, a shower head in accordance with the second aspect of the invention need not include the flow parameters and other features particular to the first aspect of the invention. In particular, whereas the illustrated shower head includes an air inlet 13 arranged around the water inlet 14 at the first end of each chamber to supply an annular flow of air to flow through the chamber 11 around the column of water ejected from the water inlet, a shower head in accordance with the second aspect of the invention need not include such an air inlet. In such alternative embodiments, the shower head may be configured for use without air to produce a spray of water only, or with aspirated air to produce a spray of aerated water, as known in the art.

Although the novel shower apparatus is intended in particular for use in bathing the human body, it should be understood that the term "shower" may encompass different configurations adapted for bathing specific portions of the human body.

In one configuration, the novel shower head may be held in the hand or mounted on a wall or other surface to produce a spray in which the user can bathe their entire body, optionally also to wash their hair. Preferably in such configurations the novel shower head includes a plurality of mixing chambers 11.

In another configuration, the novel shower head may be configured to be held in the hand or mounted in a fixed position to wash a limited body portion, e.g. the hands, the feet, or the perineal area. In such configurations the shower head may include a plurality of chambers, or only one chamber.

In one specific configuration, the novel shower head is configured similarly to a tap, optionally over a basin with a waste water connection, to provide a spray particularly for washing the hands. In such a configuration the shower head may include only one chamber 11, or may include only a small number of chambers 11, e.g. from 2-5 chambers.

In such a configuration the outlet or outlets 16 of the chamber or chambers 11 may be configured as a spout extending from a pillar or body similar to that of a conventional tap, while the user controls may be mounted on the pillar or body. The user controls 7 may include a hand operated valve which controls the flow of water, while the flow of air is controlled by the controller 6 responsive to the sensed flow of water. Alternatively the user controls 7 may include an electrical switch which initiates the flow of water and of air, the water flow being controlled for example by a valve, such as a solenoid operated valve, responsive to operation of the switch. In each case the user control 7 may be configured in the manner of a handwheel or lever or proximity sensor as found on a conventional tap for controlling the flow of water from the spout.

In each configuration (e.g. as a full body spray or as a tap), the apparatus may be controllable alternatively to produce a flow of air without water for drying the body, hands etc. after washing in the spray, wherein the flow of air may be heated.

Many further adaptations are possible within the scope of the claims.

In the claims, reference numerals and characters are provided in parentheses, purely for ease of reference, and are not to be construed as limiting features.

The invention claimed is:

1. A shower apparatus (1) including:

an air supply means (2), a water supply means (3), and a shower head (10), the shower head including at least one chamber (11);

the chamber being defined by a chamber wall (12) and extending along a central chamber axis (Xc), from an air inlet (13) and a water inlet (14) at a first end of the chamber, to an outlet (16) opening at a second end of the chamber;

the air inlet (13) being arranged around the water inlet (14);

the chamber having a length Lc along the chamber axis from the water inlet (14) to the outlet opening (16);

the water supply means being arranged for connection to a supply of water having a density $\rho_w$, surface tension $\sigma_w$ and dynamic viscosity $\mu_w$ to eject the water at a velocity $u_w$ from the water inlet (14), axially centrally into the chamber along the chamber axis (Xc), as a column of water (41) with a diameter $d_w$;

the air supply means being arranged to supply an annular flow of air (51) at a density $\rho_a$ and a velocity $u_a$ from the air inlet (13) into the chamber (11) around the water column (41);

the flow of air (51) being arranged to destabilise the water column (41) within the chamber so as to break the water column into a shower of droplets suspended in the air flowing from the outlet opening (16); wherein an aerodynamic Weber number is defined as $$We_a=(\rho_a\cdot(u_a-u_w)^2\cdot d_w)/\sigma_w$$

and a liquid Reynolds number is defined as $$Re_w=(\rho_w\cdot u_w\cdot d_w)/\mu_w$$

and wherein $u_a>u_w$ and $5\le We_a\le 55$ and $3000\le Re_w\le 10000$ and the water column (41) is contained within a dimensional envelope (61) defined as a surface of rotation about the chamber axis (Xc), and the dimensional envelope (61) is spaced apart radially inwardly from the chamber wall (12) at all points along the length Lc of the chamber, and the water column (41) is continuous for the length Lc of the chamber.

2. A shower apparatus according to claim 1, wherein $10\le We_a\le 55$.

3. A shower apparatus according to claim 1, wherein $5\le We_a\le 30$.

4. A shower apparatus according to claim 1, wherein $10\le We_a\le 30$.

5. A shower apparatus according to claim 1, wherein first guide surfaces (23') are arranged at or upstream of the air inlet (13) to guide the air to flow into the chamber (11) substantially without swirling about the chamber axis (Xc).

6. A shower apparatus according to claim 5, wherein second guide surfaces (27') are arranged at or upstream of the water inlet (14) to guide the water to flow into the chamber (11) substantially without swirling about the chamber axis (Xc).

7. A shower apparatus according to claim 1, wherein the chamber wall (12) is substantially cylindrical.

8. A shower apparatus according to claim 1, wherein the diameter $d_w$ of the water column (41) is at least 1 mm and not more than 4 mm.

9. A shower apparatus according to claim 1, wherein the shower head includes a plurality of said chambers (11).

10. A shower apparatus according to claim 9, wherein each chamber (11) includes an outer moulding (30) and an inner moulding (40);

the outer moulding (30) being formed from a first, non-elastomeric plastics material and defining an outer chamber wall (31) extending along the chamber axis (Xc), the outer chamber wall (31) being individual to the respective chamber (11) and surrounding the respective chamber axis (Xc);

the inner moulding (40) being formed from a second, elastomeric plastics material and forming a lining of the chamber (11), the lining extending along the chamber axis (Xc) and surrounded by the outer chamber wall (31).

11. A shower apparatus according to claim 10, wherein the chamber axes (Xc) are non-parallel.

12. A method of operating a shower apparatus, the shower apparatus (1) including a shower head (10), the shower head including at least one chamber (11);

the chamber (11) being defined by a chamber wall (12) and extending along a central chamber axis (Xc), from an air inlet (13) and a water inlet (14) at a first end of the chamber, to an outlet opening (16) at a second end of the chamber;

the air inlet (13) being arranged around the water inlet (14);

the chamber having a length Lc along the chamber axis (Xc) from the water inlet (14) to the outlet opening (16);

the method including:

connecting the shower head to a supply of water having a density $\rho_w$, surface tension $\sigma_w$ and dynamic viscosity $\mu_w$;

ejecting the water at a velocity $u_w$ from the water inlet (14), axially centrally into the chamber along the chamber axis (Xc), as a column of water (41) with a diameter $d_w$;

supplying an annular flow of air (51) at a density $\rho_a$ and a velocity $u_a$ from the air inlet (13) into the chamber (11) around the water column (41) to destabilise the water column within the chamber so as to break the water column (41) into a shower of droplets suspended in the air flowing from the outlet opening (16); w